(12) United States Patent
Ye et al.

(10) Patent No.: US 11,368,981 B2
(45) Date of Patent: Jun. 21, 2022

(54) LOW LATENCY PHYSICAL RANDOM ACCESS CHANNEL DESIGN

(71) Applicant: Apple Inc., Cupertino, CA (US)

(72) Inventors: Qiaoyang Ye, Fremont, CA (US); Huaning Niu, San Jose, CA (US); Abhijeet Bhorkar, Fremont, CA (US); Seau S. Lim, Wiltshire (GB); Jeongho Jeon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 749 days.

(21) Appl. No.: 16/085,532

(22) PCT Filed: Apr. 14, 2017

(86) PCT No.: PCT/US2017/027783
§ 371 (c)(1),
(2) Date: Sep. 14, 2018

(87) PCT Pub. No.: WO2017/181124
PCT Pub. Date: Oct. 19, 2017

(65) Prior Publication Data
US 2021/0204316 A1    Jul. 1, 2021

Related U.S. Application Data

(60) Provisional application No. 62/322,440, filed on Apr. 14, 2016.

(51) Int. Cl.
*H04W 4/00* (2018.01)
*H04W 74/08* (2009.01)
*H04W 74/00* (2009.01)

(52) U.S. Cl.
CPC ..... *H04W 74/0808* (2013.01); *H04W 74/006* (2013.01); *H04W 74/0833* (2013.01)

(58) Field of Classification Search
CPC . H04W 74/0808; H04W 74/006; H04W 8/33; H04W 74/0833; H04L 27/0006
(Continued)

(56) References Cited

U.S. PATENT DOCUMENTS 9,253,692 B1 * 2/2016 Shah ................. H04W 36/0072
9,357,420 B2 * 5/2016 Ahn ...................... H04W 24/10
(Continued)

OTHER PUBLICATIONS

International Search Report and Written Opinion for International Patent Application No. PCT/US17/27783, dated Aug. 31, 2017.
(Continued)

*Primary Examiner* — Mahendra R Patel
(74) *Attorney, Agent, or Firm* — Sterne, Kessler, Goldstein & Fox P.L.L.C.

(57) ABSTRACT

Described is an apparatus of an Evolved Node-B (eNB) operable to communicate with a User Equipment (UE) on a wireless network. The apparatus may comprise a first circuitry and a second circuitry. The first circuitry may be operable to initiate a Listen-Before-Talk (LBT) procedure on a bandwidth of the wireless network, the bandwidth being unlicensed spectrum. The second circuitry may be operable to generate a transmission if the LBT procedure indicates that the bandwidth is idle, the transmission comprising a Physical Random Access Channel (PRACH) preamble portion and a message portion.

20 Claims, 12 Drawing Sheets

(58) Field of Classification Search
USPC .............................. 370/329, 310.2; 455/518
See application file for complete search history.

(56) References Cited

U.S. PATENT DOCUMENTS

| | | | |
|---|---|---|---|
| 10,736,148 B2* | 8/2020 | Li | H04W 74/0833 |
| 2010/0098010 A1* | 4/2010 | Kuo | H04W 72/1242 |
| | | | 370/329 |
| 2012/0300752 A1* | 11/2012 | Kwon | H04W 74/0833 |
| | | | 370/336 |
| 2013/0315152 A1* | 11/2013 | Ratasuk | H04W 76/14 |
| | | | 370/329 |
| 2014/0126530 A1* | 5/2014 | Siomina | H04W 52/244 |
| | | | 370/330 |
| 2014/0161002 A1* | 6/2014 | Gauvreau | H04L 1/1893 |
| | | | 370/280 |
| 2016/0050667 A1 | 2/2016 | Papasakellariou et al. | |
| 2016/0149681 A1* | 5/2016 | Vajapeyam | H04W 24/10 |
| | | | 370/252 |
| 2016/0234706 A1* | 8/2016 | Liu | H04W 72/0453 |
| 2016/0286545 A1* | 9/2016 | Luo | H04L 1/1812 |
| 2016/0323915 A1* | 11/2016 | Liu | H04W 74/0833 |
| 2017/0034853 A1* | 2/2017 | Rune | H04W 52/0216 |
| 2017/0142743 A1* | 5/2017 | Yoon | H04W 72/1215 |
| 2017/0280448 A1* | 9/2017 | Takeda | H04W 16/14 |
| 2018/0070382 A1* | 3/2018 | Lee | H04W 52/02 |
| 2018/0213571 A1* | 7/2018 | Wang | H04W 74/004 |
| 2018/0227911 A1* | 8/2018 | Belghoul | H04W 74/0816 |
| 2018/0255586 A1* | 9/2018 | Einhaus | H04W 52/00 |
| 2019/0029054 A1* | 1/2019 | Li | H04W 74/006 |
| 2019/0124687 A1* | 4/2019 | Yang | H04L 27/0006 |
| 2019/0200386 A1* | 6/2019 | Yang | H04W 74/08 |
| 2019/0281636 A1* | 9/2019 | Liu | H04W 72/0446 |
| 2021/0029768 A1* | 1/2021 | Shih | H04W 74/0808 |

OTHER PUBLICATIONS

NTT Docomo, et al., "Discussion on PRACH for eLAA UL", 3GPP Draft; R1-160950; vol. RAN WG1; St. Julian's, Malta; Feb. 15, 2016.
Qualcomm, "RACH Procedure for Enhanced LAA", 3GPP Draft; R2-162911; vol. RAN WG2; Dubrovnik, Croatia; Apr. 12, 2016.
International Preliminary Report on Patentability for International Patent Application No. PCT/US17/27783, dated Oct. 25, 2018.

* cited by examiner

| R | TA Command |
|---|---|
| TA Command | UL Grant |
| UL Grant ||
| UL Grant ||
| C-RNTI ||
| C-RNTI ||

LOW LATENCY PHYSICAL RANDOM ACCESS CHANNEL DESIGN

CLAIM OF PRIORITY

This Application is a National Stage Entry of, and claims priority to, PCT Application No. PCT/US17/27783, filed on Apr. 14, 2017 and titled "Low Latency Physical Random Access Channel Design", which claims priority under 35 U.S.C. § 119(e) to U.S. Provisional Patent Application Ser. No. 62/322,440 filed Apr. 14, 2016 and entitled "Low Latency PRACH Design For Large MulteFire Cells," both of which are herein incorporated by reference in their entireties.

BACKGROUND

Various wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system. Next-generation wireless cellular communication systems may provide support for higher bandwidths in part by using unlicensed spectrum

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

FIG. 4 illustrates a Random Access Response (RAR) structure, in accordance with some embodiments of the disclosure.

DETAILED DESCRIPTION

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation wireless/5th Generation mobile networks (5G) system. The rapid growth of wireless traffic has led to a desire for data rate improvement. On one hand, with mature physical layer techniques, further improvement in spectral efficiency may be marginal. On the other hand, a scarcity of licensed spectrum in low frequency bands may hinder efforts to increase data rates by increasing use of licensed spectrum. Thus, there is an emerging interest in operation of LTE systems in unlicensed spectrum.

One enhancement for LTE in 3GPP Release 13 (frozen, end date 2016 Mar. 11 (SP-71)) has been to enable its operation in unlicensed spectrum via Licensed-Assisted Access (LAA), which may expand system bandwidths by utilizing a flexible Carrier Aggregation (CA) framework introduced for LTE-A systems. Enhanced operation of LTE systems in unlicensed spectrum may be supported in future releases and 5G systems. LTE operation in unlicensed spectrum may include LTE operation in unlicensed spectrum via Dual Connectivity (DC), and/or standalone LTE operation systems in unlicensed spectrum.

LTE-based technology may operate solely in unlicensed spectrum without relying upon an "anchor" in the licensed spectrum, such as in MulteFire™ technology by MulteFire Alliance of Fremont Calif., USA. Standalone LTE operation in unlicensed spectrum may combine performance benefits of LTE technology with a relative simplicity of Wi-Fi®-like deployments. (Wi-Fi® is a registered trademark of the Wi-Fi Alliance of Austin, Tex., USA.) Standalone LTE operation may accordingly be an advantageous technology in meeting demands of ever-increasing wireless traffic.

An unlicensed frequency band of current interest is the 5 GHz band, which has wide spectrum with global common availability. The 5 GHz band in the US may be governed by Unlicensed National Information Infrastructure (U-NII) rules promulgated by the Federal Communications Commission (FCC). The main incumbent systems in the 5 GHz band are Wireless Local Area Networks (WLAN) systems, specifically those based on Institute of Electrical and Electronics Engineers (IEEE) 802.11 a/n/ac technologies, which may be used for Wi-Fi® networks.

Since WLAN systems may be deployed both by individuals and operators for carrier-grade access service and data offloading, care should be taken before deployment of competing systems. Listen-Before-Talk (LBT) procedures may be implemented in LTE LAA systems and/or MulteFire™ systems to promote fair coexistence with incumbent systems (e.g., WLAN systems). LBT is a procedure whereby a radio transmitter may first sense a medium, then transmit if the medium is sensed to be idle.

Figure 1:
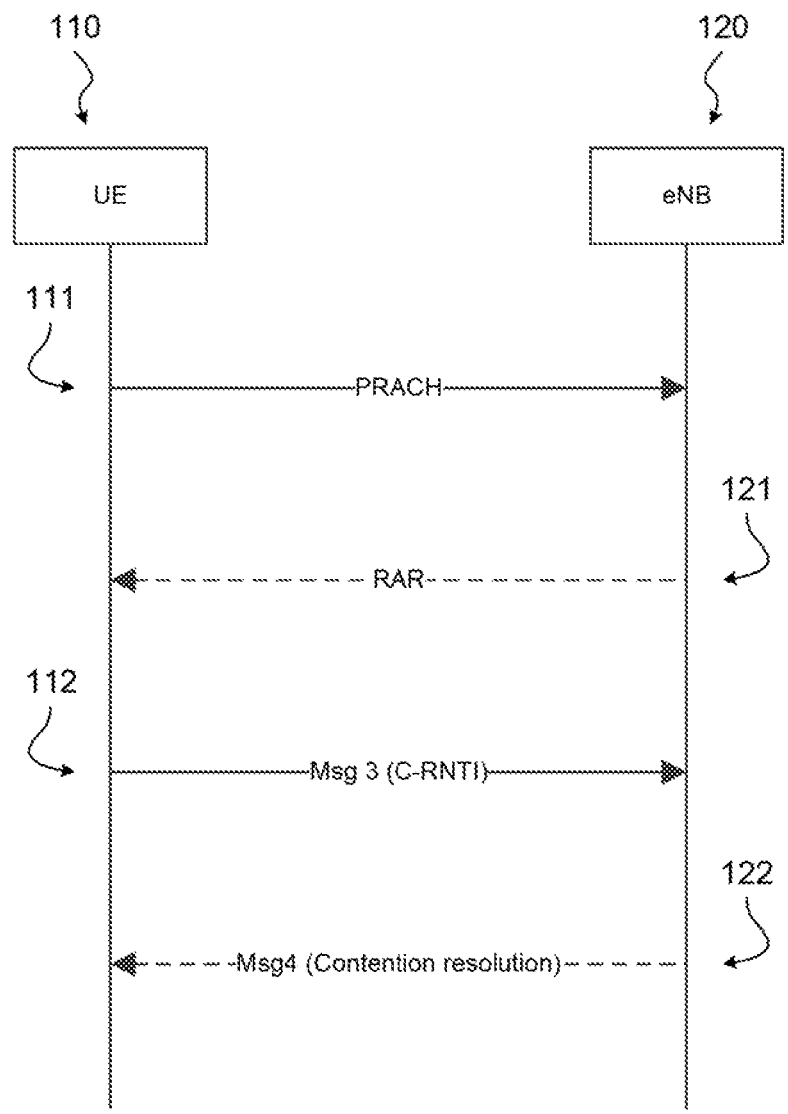
FIG. 1 illustrates a four-step Physical Random Access Channel (PRACH) procedure, in accordance with some embodiments of the disclosure.

FIG. 1 illustrates a four-step Physical Random Access Channel (PRACH) procedure, in accordance with some embodiments of the disclosure. A PRACH procedure 100 between a UE 110 and an eNB 120 may comprise a first UE transmission 111, a first eNB transmission 121, a second UE transmission 112, and a second eNB transmission 122. First UE transmission 111 may bear PRACH. First eNB transmission 121 may bear an RAR in response to the PRACH. Second UE transmission 112 may bear a Message 3, which may in turn carry a Cell Radio Network Temporary Identifier (C-RNTI), which may identify UE 110. Second eNB transmission 122 may bear a Message 4, which may resolve potential contention.

In various embodiments, a PRACH procedure may be used for Scheduling Request (SR) purposes, Uplink (UL) synchronization, and power control for initial UL transmission. PRACH procedure 100 may be used for SR purposes, for example.

In unlicensed spectrum, transmissions may be subject to LBT procedures. In the context of PRACH procedure 100, UE 110 may be disposed to performing an LBT procedure before transmission of a PRACH preamble in first UE transmission 111, eNB 120 may be disposed to performing an LBT procedure before transmission of an RAR in first eNB transmission 121, UE 110 may be disposed to performing an LBT procedure before transmission of a Message 3 in second UE transmission 112, and eNB 120 may be disposed to performing an LBT procedure before transmission of a Message 4 in second eNB transmission 122. Accordingly, UE 110 and eNB 120 may be disposed to performing up to four LBT procedures for a four-step PRACH procedure. This may significantly increase delay and may limit UL transmissions.

MulteFire™ systems may improve UL performance (e.g., in unlicensed spectrum) through low-latency PRACH design. For smaller MulteFire™ cells, PRACH may occupy between two and four Orthogonal Frequency Division Multiplex (OFDM) symbols, and may reuse short Physical Uplink Control Channel (sPUCCH).

Figure 2:
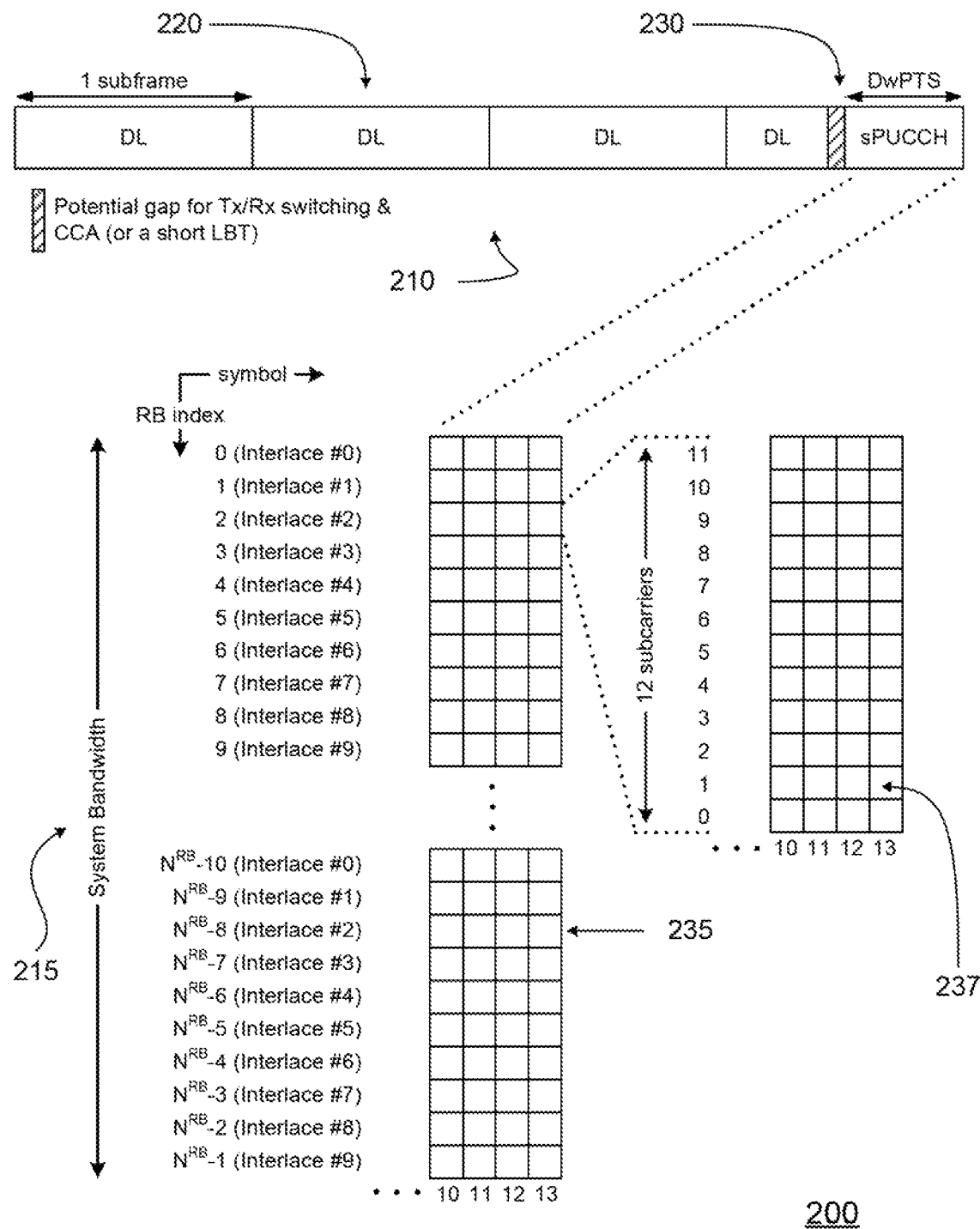
FIG. 2 illustrates a scenario of short Physical Uplink Control Channel (sPUCCH) resource structuring, in accordance with some embodiments of the disclosure.

FIG. 2 illustrates a scenario of sPUCCH resource structuring, in accordance with some embodiments of the disclosure. In a scenario 200, a series of subframes 210 may comprise one or more Downlink (DL) subframes 220 and one or more DL/UL subframes 230. One or more of the DL/UL subframes 230 may comprise a DL portion, an sPUCCH portion, and a gap between the two for Tx-to-Rx switching, Clear Channel Assessment, and/or a short LBT procedure.

In DL/UL subframes 230, a system bandwidth 215 may span a plurality of RBs 235 (which may be enumerated from an RB number 0 through an RB number $N^{RB}-1$). RBs 235 may themselves comprise a plurality of Resource Elements (REs) 237, which may span 12 subcarrier frequencies (which may be enumerated from 0 to 11) and 14 OFDM symbols (which may be enumerated from 0 to 13). In some embodiments, OFDM symbols 10 through 13 across one or more of RBs 235 (up to and including all of RBs 235) may carry sPUCCH.

As discussed herein, larger MulteFire™ cells may incorporate alternate PRACH procedures, in which the transmission in a first step of a PRACH procedure may occupy a regular UL subframe. In various procedures discussed herein, PRACH latency may advantageously be reduced in two-step and single-step PRACH procedures that may perform contention resolution and UL grant allocation. For some embodiments, one or more UL transmissions in a PRACH procedure may span one or more interlaces.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE eNB, a next-generation or 5G eNB, an Access Point (AP), and/or another base station for a wireless communication system. For purposes of the present disclosure, the term "UE" may refer to a legacy LTE UE, a next-generation or 5G UE, a Station (STA), and/or another mobile equipment for a wireless communication system.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFMD) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

Figure 3:
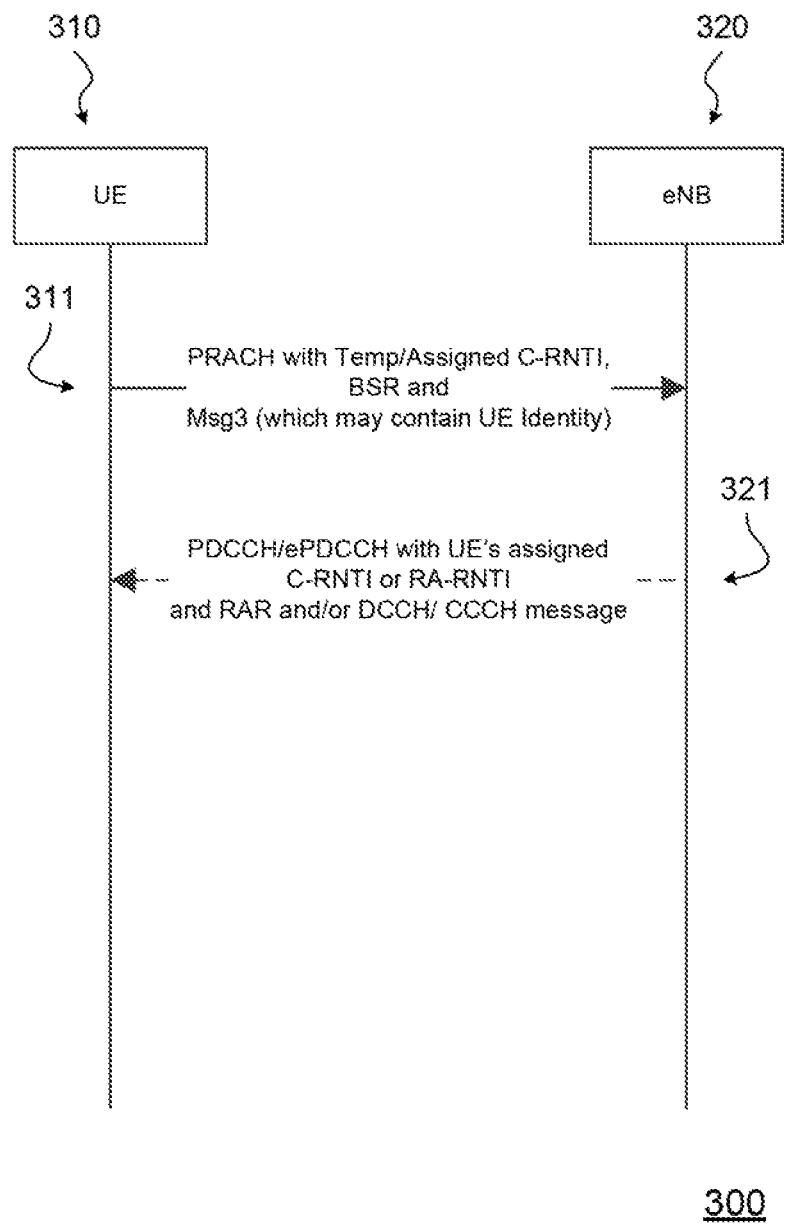
FIG. 3 illustrates a two-step PRACH procedure, in accordance with some embodiments of the disclosure.

FIG. 3 illustrates a two-step PRACH procedure, in accordance with some embodiments of the disclosure. A PRACH procedure 300 between a UE 310 and an eNB 320 may comprise a UE transmission 311 and a eNB transmission 321. UE 310 may perform an LBT procedure, and if the LBT procedure succeeds (e.g., if it indicates that the wireless medium is idle), in UE transmission 311, UE 310 may transmit a PRACH preamble portion together with a message portion (e.g., a Message 3). eNB 320, in eNB transmission 321, may then transmit an RAR and/or a Message 4.

The PRACH preamble portion of UE transmission 311 (together with its message portion) may carry a Temporary C-RNTI and/or Assigned C-RNTI, a Buffer Status Report (BSR) indicator bearing BSR information, and/or a Layer 1 (L1) or Medium Access Control (MAC) UE capability indicator. The message portion of UE transmission 311 may carry a UE identity used for contention resolution. For example, the UE identity may comprise a System Architecture Evolution (SAE) Temporary Mobile Subscriber Identity (S-TMSI), an International Mobile Subscriber Identity (IMSI), or another UE identity.

In various embodiments, the message portion of UE transmission 311 may include one or more of: a MAC part which may contain a possible Temporary C-RNTI and/or Assigned C-RNTI; BSR information; and/or an L1 and/or MAC UE capability indicator. The message portion of UE transmission 311 may also include an RRC part containing an RRC message carrying at least a UE identity, which may be employed for contention resolution in eNB transmission 321. In some embodiments, the MAC part of UE transmission 311 may include a UE identity which may be employed for contention resolution in eNB transmission 321.

The RAR and/or Message 4 of eNB transmission 321 may contain a Radio Resource Control (RRC) message (e.g., RRC Connection Setup) which may be scheduled via Physical Downlink Control Channel (PDCCH) or enhanced PDCCH (ePDCCH) using an Assigned C-RNTI or a common Random Access Radio Network Temporary Identifier (RA-RNTI) of UE 110, which may be calculated based upon time/frequency resources used by the preamble transmission in UE transmission 311.

In various embodiments, contention resolution may be performed either based upon PDCCH, or ePDCCH, or the MAC part, or the RRC part. In some embodiments, contention resolution may be successful if the PDCCH or ePDCCH contains an assigned C-RNTI of UE 310. For some embodiments, contention resolution may be successful if the MAC part contains an Assigned C-RNTI or a UE identity for UE 310 provided in UE transmission 311. In some embodiments, contention resolution may be successful if the RRC part (which may contain an RRC message) contains an Assigned C-RNTI or a UE identity for UE 310. For some embodiments, an RAR and/or a Dedicated Control Channel (DCCH) and/or a Common Control Channel (CCCH) message may contain an Assigned C-RNTI or a UE identity for UE 310.

In various embodiments, UL grant allocation (apart from existing allocation in RAR) may be provided in various ways. In some embodiments, UL grant allocation may be provided in PDCCH or ePDCCH, with an Assigned C-RNTI (e.g., UE 310 may decode DL DCI as well as UL DCI masked with an Assigned C-RNTI of UE 310). For some embodiments, UL grant allocation may be provided in PDCCH or ePDCCH with RA-RNTI (e.g., UE 310 may decode DL DCI as well as UL DCI masked with RA-RNTI). In some embodiments, an RRC message may contain a UL grant. In various embodiments, the UL grant might be applied if contention resolution is successful.

FIG. 4 illustrates a Random Access Response (RAR) structure, in accordance with some embodiments of the disclosure. In various embodiments, RAR structure 400 may include a UE's Assigned C-RNTI rather than a Temporary C-RNTI.

Figure 5:
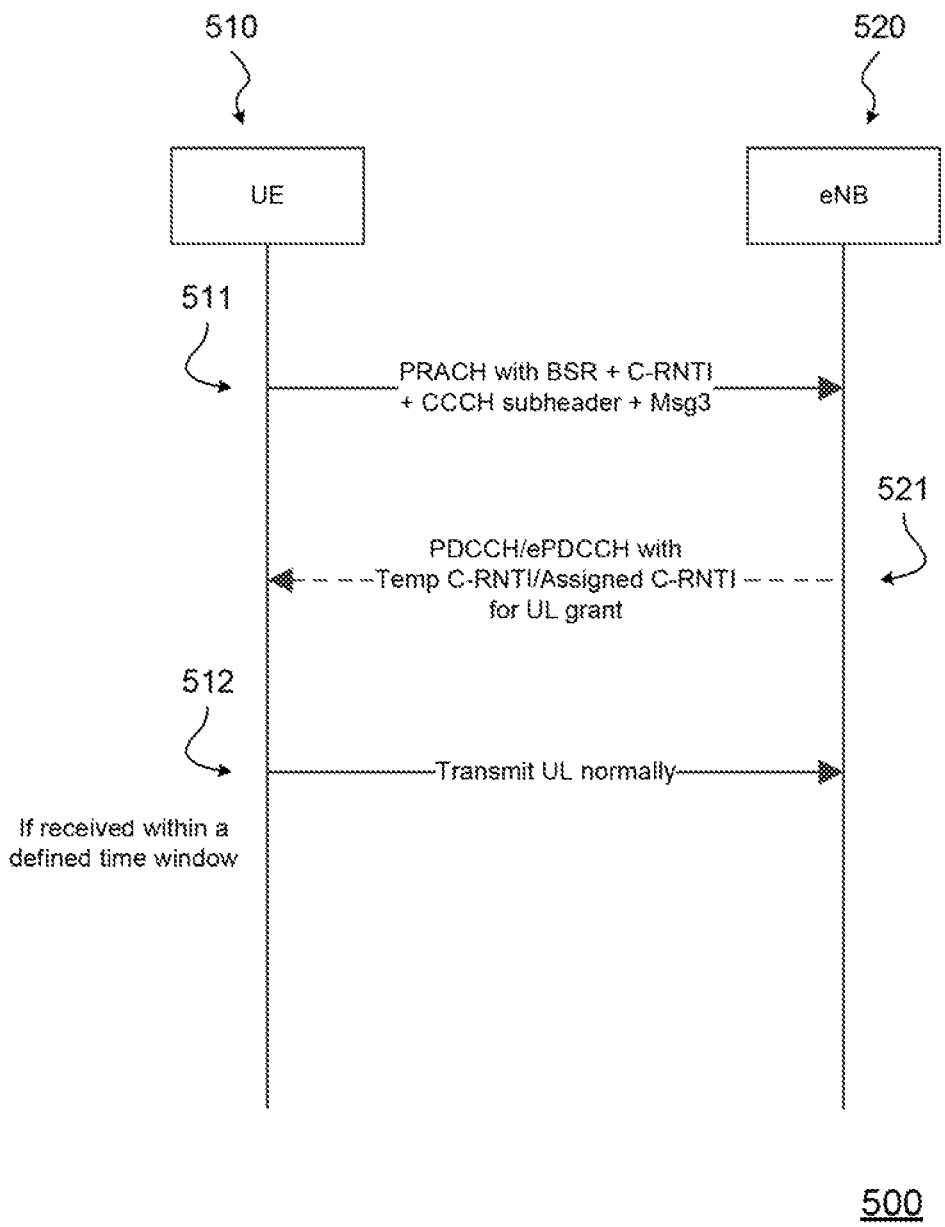
FIG. 5 illustrates a successful PRACH attempt of a single-step PRACH procedure, in accordance with some embodiments of the disclosure.

FIG. 5 illustrates a successful PRACH attempt of a single-step PRACH procedure, in accordance with some embodiments of the disclosure. A PRACH procedure 500 between a UE 510 and an eNB 520 may comprise a first UE transmission 511, an eNB transmission 521, and a second UE transmission 512. UE 510 may perform an LBT procedure, and if the LBT procedure succeeds (e.g., if it indicates that the wireless medium is idle), in first UE transmission 511, UE 510 may transmit a PRACH preamble portion, together with: a Temp C-RNTI or Assigned C-RNTI for UE 510; an indicator bearing BSR information; a CCCH subheader; and/or a Message 3.

eNB 520 may transmit eNB transmission 521, which may contain a RRC message which may be scheduled via PDCCH or ePDCCH using a Temporary C-RNTI or an Assigned C-RNTI for UL grant. If UE 510 receives eNB transmission 521 (e.g., if UE 510 receives the UL grant) within either k subframes or a duration of a contention-resolution timer for a Temporary C-RNTI and/or Assigned C-RNTI (e.g., a MACContentionResolution timer, which may indicate successful contention resolution), UE 510 may transmit its UL data normally in second UE transmission 512.

In some embodiments, the time window of k subframes may be in terms of an absolute time (e.g., k milliseconds). For some embodiments, the time window of k subframes may be in terms of a number of valid DL subframes (e.g., subframes with DL transmission). Second UE transmission 512 may be subject to an LBT procedure.

Figure 6:
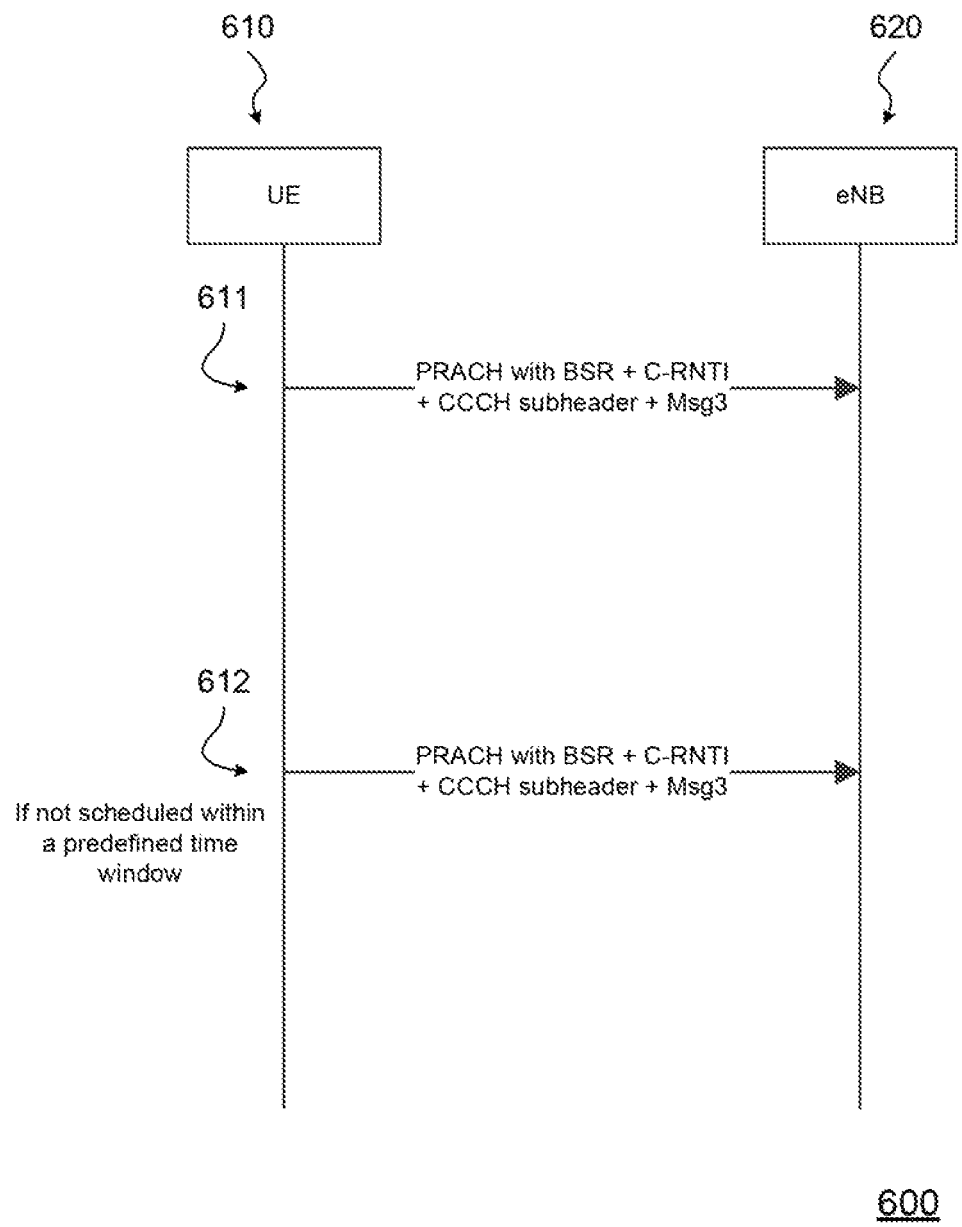
FIG. 6 illustrates a failed PRACH attempt of a single-step PRACH procedure, in accordance with some embodiments of the disclosure.

FIG. 6 illustrates a failed PRACH attempt of a single-step PRACH procedure, in accordance with some embodiments of the disclosure. A PRACH procedure 600 between a UE 610 and an eNB 620 may comprise a first UE transmission 611 and a second UE transmission 612. UE 610 may perform an LBT procedure, and if the LBT procedure succeeds (e.g., if it indicates that the wireless medium is idle), in first UE transmission 611, UE 610 may transmit a PRACH preamble portion, together with: a Temp C-RNTI or Assigned C-RNTI for UE 610; an indicator bearing BSR information; a CCCH subheader; and/or a Message 3.

If UE 610 does not receive eNB transmission 521 (e.g., if UE 510 does not receive a UL grant) within either k subframes or a duration of a contention-resolution timer for a Temporary C-RNTI and/or Assigned C-RNTI (e.g., a MACContentionResolution timer, which may indicate successful contention resolution), UE 610 may re-transmit first UE transmission 611 as second UE transmission 612. In some embodiments, for second UE transmission 612, UE 610 may transmit a new PRACH signal with a new random preamble index at a configured PRACH subframe.

In some embodiments, the time window of k subframes may be in terms of an absolute time (e.g., k milliseconds). For some embodiments, the time window of k subframes may be in terms of a number of valid DL subframes (e.g., subframes with DL transmission). Second UE transmission 612 may be subject to an LBT procedure.

In some embodiments (e.g., for small cells), PRACH may use an sPUCCH waveform for small cells. In some embodiments (e.g., for large cells), PRACH may be transmitted over ePUCCH resources. For example, PRACH may be transmitted over a regular UL subframe.

A PRACH preamble and data (e.g. BSR, CCCH, Message 3, etc.) may be transmitted in a variety of methods. In some embodiments, a PRACH preamble may be transmitted in one or more interlaces, over a full UL subframe. For some embodiments, data in the low-latency PRACH procedures proposed herein (e.g., BSR, CCCH subheader, Message 3, etc.) may be transmitted in one or more of the remaining interlaces over the same UL subframe.

If one interlace is allocated for PRACH in 20 megahertz (MHz) systems, there may be 140 RBs available over 14 symbols for data transmission. With Quadrature Phase-Shift Keying (QPSK) modulation, each interlace may carry up to 3360 bits. For example, a required payload size for initial access and BSR may be 56 bits, with an additional 24 Cyclic Redundancy Check (CRC) bits. With a coding rate of 1/3, a number of coded bits resulting from the 80 total bits of BSR and CRC may be 240, which may be much smaller than a capability of various proposed designs (e.g., 3360 bits), and may therefore be sufficient for the proposed designs.

For some embodiments, a guard band may be advantageous, since the UE might not be synchronized. Therefore, available REs may be reduced due to resources reserved for the guard band. Such methods may provide multiplexing between PRACH preamble and data transmission in frequency domain.

Alternatively, in some embodiments, a PRACH preamble may be transmitted in a subset of OFDM symbols within a UL subframe, which may be denoted by a set X which may in turn be a subset of a larger set $\{0, 1, 2, \ldots, 13\}$. Data to be transmitted in a first step of a low latency PRACH procedure may be carried in remaining symbols within the UL subframe. The elements in set X (e.g., the subset of OFDM symbols within the UL subframe in which the PRACH preamble may be transmitted) may be consecutive within the larger set or may be distributed within the larger set.

The PRACH preamble may be used as reference signals for coherent detection of data transmitted in the first step of the PRACH procedure. In such embodiments, in the frequency domain, the PRACH preamble and data may be transmitted in one or more interlaces. Available REs for data transmission in this option may be fewer than in other options described herein, if the same number of interlaces are used for PRACH transmission.

Various embodiments may accommodate relatively large payload sizes in various ways. In some embodiments, multiple interlaces may be used if a size of data to be transmitted is large (e.g., if a size of data to be transmitted exceeds a predetermined threshold amount). For some embodiments, a coding rate may be reduced to make a coded data fit into available REs. Different UEs can be multiplexed over a code domain (e.g., via Orthogonal Cover Code (OCC)) and/or a frequency domain.

Some embodiments may support a fallback method by which a legacy LTE PRACH procedure may be used. If a message part (e.g., a C-RNTI, BSR, Message 3, and/or CCCH subheader) that is transmitted simultaneously over the allocated PRACH resources in the first step (e.g., first UE transmission 611) cannot be correctly detected, but the PRACH preamble sequence is correctly detected, a two-step PRACH procedure and/or a single-step PRACH procedure) may fall back to legacy LTE four-step PRACH procedure. In such embodiments, the subsequent steps may be substantially similar to (or the same as) steps subsequent to an analogous step in a legacy LTE four-step PRACH procedure (e.g., the procedure of FIG. 1).

Figure 7:
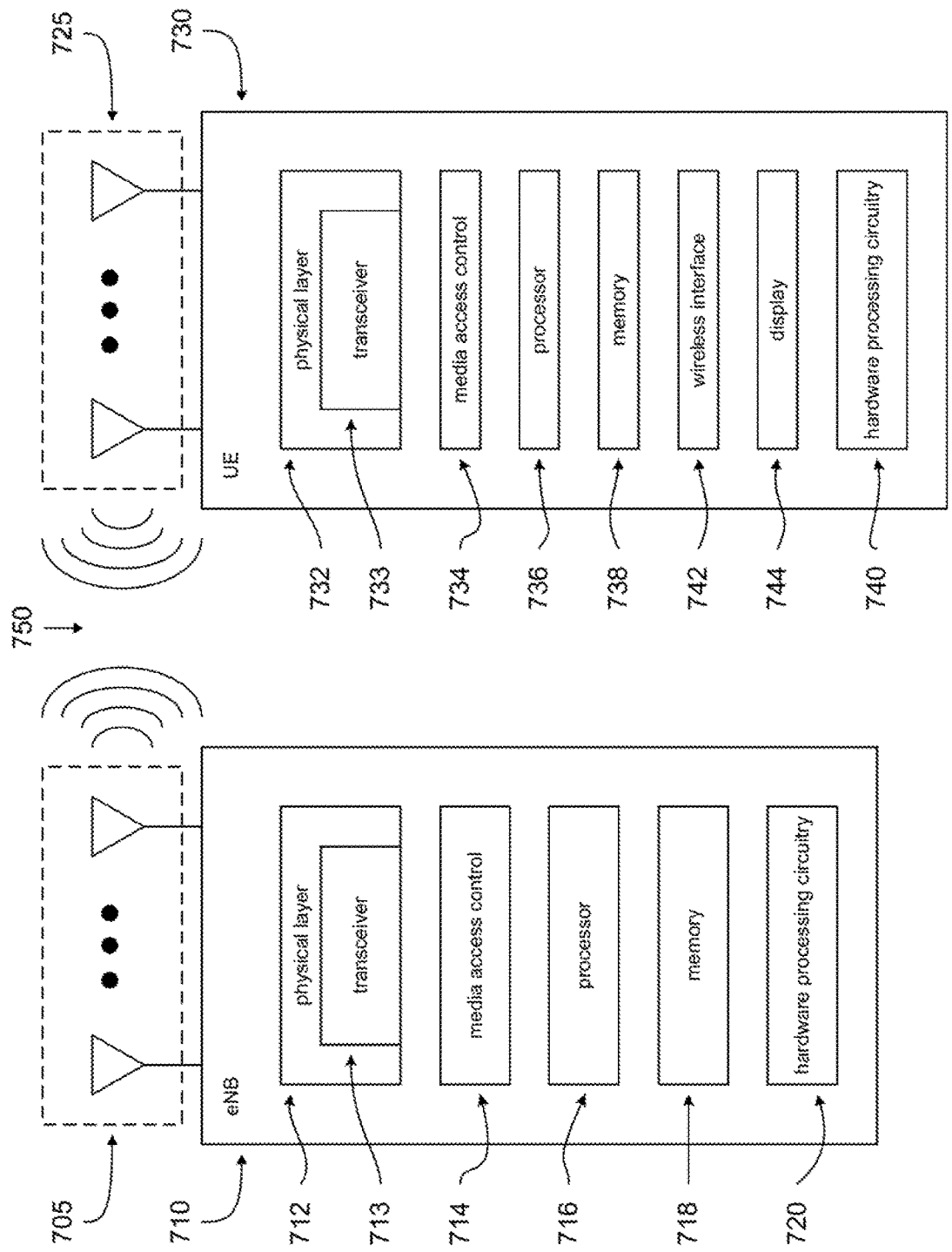
FIG. 7 illustrates an Evolved Node B (eNB) and a User Equipment (UE), in accordance with some embodiments of the disclosure.

FIG. 7 illustrates an eNB and a UE, in accordance with some embodiments of the disclosure. FIG. 7 includes block diagrams of an eNB 710 and a UE 730 which are operable to co-exist with each other and other elements of an LTE network. High-level, simplified architectures of eNB 710 and UE 730 are described so as not to obscure the embodiments. It should be noted that in some embodiments, eNB 710 may be a stationary non-mobile device.

eNB 710 is coupled to one or more antennas 705, and UE 730 is similarly coupled to one or more antennas 725. However, in some embodiments, eNB 710 may incorporate or comprise antennas 705, and UE 730 in various embodiments may incorporate or comprise antennas 725.

In some embodiments, antennas 705 and/or antennas 725 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 705 are separated to take advantage of spatial diversity.

eNB 710 and UE 730 are operable to communicate with each other on a network, such as a wireless network. eNB 710 and UE 730 may be in communication with each other over a wireless communication channel 750, which has both a downlink path from eNB 710 to UE 730 and an uplink path from UE 730 to eNB 710.

As illustrated in FIG. 7, in some embodiments, eNB 710 may include a physical layer circuitry 712, a MAC (media access control) circuitry 714, a processor 716, a memory 718, and a hardware processing circuitry 720. A person skilled in the art will appreciate that other components not shown may be used in addition to the components shown to form a complete eNB.

In some embodiments, physical layer circuitry 712 includes a transceiver 713 for providing signals to and from UE 730. Transceiver 713 provides signals to and from UEs or other devices using one or more antennas 705. In some embodiments, MAC circuitry 714 controls access to the wireless medium. Memory 718 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 720 may comprise logic devices or circuitry to perform various operations. In some embodiments, processor 716 and memory 718 are arranged to perform the operations of hardware processing circuitry 720, such as operations described herein with reference to logic devices and circuitry within eNB 710 and/or hardware processing circuitry 720.

Accordingly, in some embodiments, eNB 710 may be a device comprising an application processor, a memory, one or more antenna ports, and an interface for allowing the application processor to communicate with another device.

As is also illustrated in FIG. 7, in some embodiments, UE 730 may include a physical layer circuitry 732, a MAC circuitry 734, a processor 736, a memory 738, a hardware processing circuitry 740, a wireless interface 742, and a display 744. A person skilled in the art would appreciate that other components not shown may be used in addition to the components shown to form a complete UE.

In some embodiments, physical layer circuitry 732 includes a transceiver 733 for providing signals to and from eNB 710 (as well as other eNBs). Transceiver 733 provides signals to and from eNBs or other devices using one or more antennas 725. In some embodiments, MAC circuitry 734 controls access to the wireless medium. Memory 738 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 742 may be arranged to allow the processor to communicate with another device. Display 744 may provide a visual and/or tactile display for a user to interact with UE 730, such as a touch-screen display. Hardware processing circuitry 740 may comprise logic devices or circuitry to perform various operations. In some embodiments, processor 736 and memory 738 may be arranged to perform the operations of hardware processing circuitry 740, such as operations described herein with reference to logic devices and circuitry within UE 730 and/or hardware processing circuitry 740.

Accordingly, in some embodiments, UE 730 may be a device comprising an application processor, a memory, one or more antennas, a wireless interface for allowing the application processor to communicate with another device, and a touch-screen display.

Elements of FIG. 7, and elements of other figures having the same names or reference numbers, can operate or function in the manner described herein with respect to any such figures (although the operation and function of such elements is not limited to such descriptions). For example, FIGS. 8-9 also depict embodiments of eNBs, hardware processing circuitry of eNBs, UEs, and/or hardware processing circuitry of UEs, and the embodiments described with respect to FIG. 7 and FIGS. 8-9 can operate or function in the manner described herein with respect to any of the figures.

In addition, although eNB 710 and UE 730 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 8:
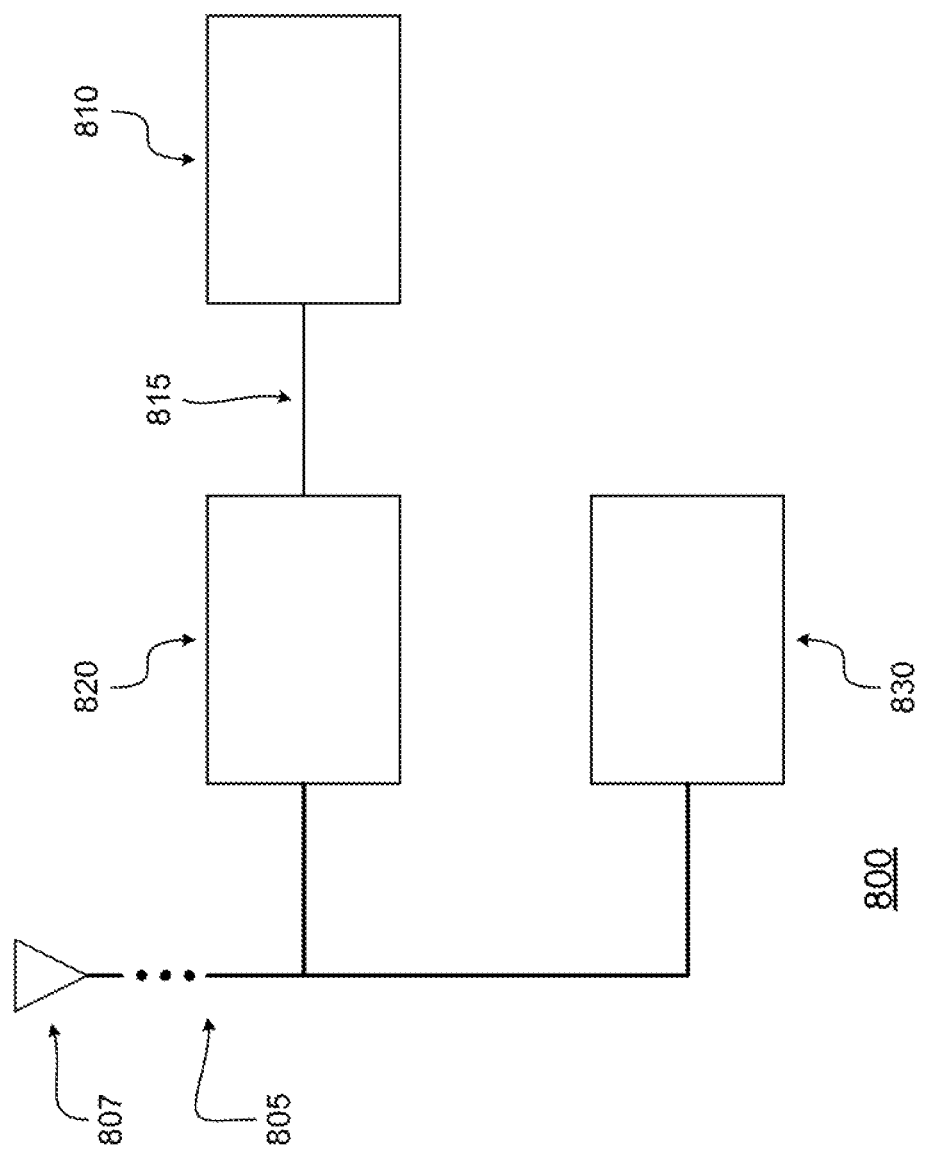
FIG. 8 illustrates hardware processing circuitries for a UE to support low-latency PRACH procedures, in accordance with some embodiments of the disclosure.

FIG. 8 illustrates hardware processing circuitries for a UE to support low-latency PRACH procedures, in accordance with some embodiments of the disclosure. With reference to FIG. 7, a UE may include various hardware processing circuitries discussed herein (such as hardware processing circuitry 800 of FIG. 8), which may in turn comprise logic devices and/or circuitry operable to perform various operations. For example, in FIG. 7, UE 730 (or various elements or components therein, such as hardware processing circuitry 740, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 736 (and/or one or more other processors which UE 730 may comprise), memory 738, and/or other elements or components of UE 730 (which may include hardware processing circuitry 740) may be arranged to perform the operations of these hardware processing circuitries, such as operations described herein with reference to devices and circuitry within these hardware processing circuitries. In some embodiments, processor 736 (and/or one or more other processors which UE 730 may comprise) may be a baseband processor.

Returning to FIG. 8, an apparatus of UE 730 (or another UE or mobile handset), which may be operable to communicate with one or more eNBs on a wireless network, may comprise hardware processing circuitry 800. In some embodiments, hardware processing circuitry 800 may comprise one or more antenna ports 805 operable to provide various transmissions over a wireless communication channel (such as wireless communication channel 750). Antenna ports 805 may be coupled to one or more antennas 807 (which may be antennas 725). In some embodiments, hardware processing circuitry 800 may incorporate antennas 807, while in other embodiments, hardware processing circuitry 800 may merely be coupled to antennas 807.

Antenna ports 805 and antennas 807 may be operable to provide signals from a UE to a wireless communications channel and/or an eNB, and may be operable to provide signals from an eNB and/or a wireless communications channel to a UE. For example, antenna ports 805 and antennas 807 may be operable to provide transmissions from UE 730 to wireless communication channel 750 (and from there to eNB 710, or to another eNB). Similarly, antennas 807 and antenna ports 805 may be operable to provide transmissions from a wireless communication channel 750 (and beyond that, from eNB 710, or another eNB) to UE 730.

Hardware processing circuitry 800 may comprise various circuitries operable in accordance with the various embodiments discussed herein. With reference to FIG. 8, hardware processing circuitry 800 may comprise a first circuitry 810, a second circuitry 820, and/or a third circuitry 830. First circuitry 810 may be operable to initiate an LBT procedure on a bandwidth of the wireless network, the bandwidth being unlicensed spectrum. Second circuitry 820 may be operable to generate a transmission if the LBT procedure indicates that the bandwidth is idle, the transmission comprising a PRACH preamble portion and a message portion. First circuitry 810 may be operable to provide information regarding the initiated LBT procedure to second circuitry 820 via an interface 815.

In some embodiments, the message portion of the first transmission may comprise a MAC part carrying at least one of: a C-RNTI assigned to the UE, a BSR indicator, a Layer 1 or MAC UE capability indicator, a UE identity for contention resolution, or a RRC part including an RRC message with a UE identity for contention resolution.

In some embodiments, the transmission may be a first transmission, and third circuitry 830 may be operable to process a second transmission comprising at least one of: a RAR, or a message portion.

For some embodiments, the second transmission may comprise one of: a PDCCH containing the C-RNTI assigned to the UE or the UE identity, or an ePDCCH containing the C-RNTI assigned to the UE or the UE identity. In some embodiments, the second transmission may comprise a MAC part carrying the C-RNTI assigned to the UE or the UE identity. For some embodiments, the second transmission may comprise an RRC part including an RRC message carrying at least one of: the C-RNTI assigned to the UE, or the UE identity for contention resolution. In some embodiments, the second transmission may carry a UL grant allocation.

In some embodiments, the transmission may be a first transmission, third circuitry 830 may be operable to generate a re-transmission of the first transmission if a UL grant allocation is not processed within a predetermined time window.

For some embodiments, the re-transmission of the first transmission may comprise a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution. In some embodiments, the predetermined time window may be one of: an absolute time, or a number of subframes bearing DL transmission. For some embodiments, the UL grant allocation may be masked with the C-RNTI assigned to the UE.

In some embodiments, the PRACH preamble portion may be generated to span one or more interlaces of a plurality of interlaces within a UL subframe, and a remainder of the plurality of interlaces within the UL subframe may be generated to include data transmission. For some embodiments, the PRACH preamble portion may be generated to span a subset of OFDM symbols within a UL subframe, and a remainder of OFDM symbols within the UL subframe may be generated to include data transmission.

For some embodiments, the PRACH preamble portion may incorporate a sPUCCH waveform. In some embodiments, the PRACH preamble portion may be mapped to ePUCCH resources.

In some embodiments, first circuitry 810, second circuitry 820, and/or third circuitry 830 may be implemented as separate circuitries. In other embodiments, first circuitry 810, second circuitry 820, and third circuitry 830 may be combined and implemented together in a circuitry without altering the essence of the embodiments.

Figure 9:
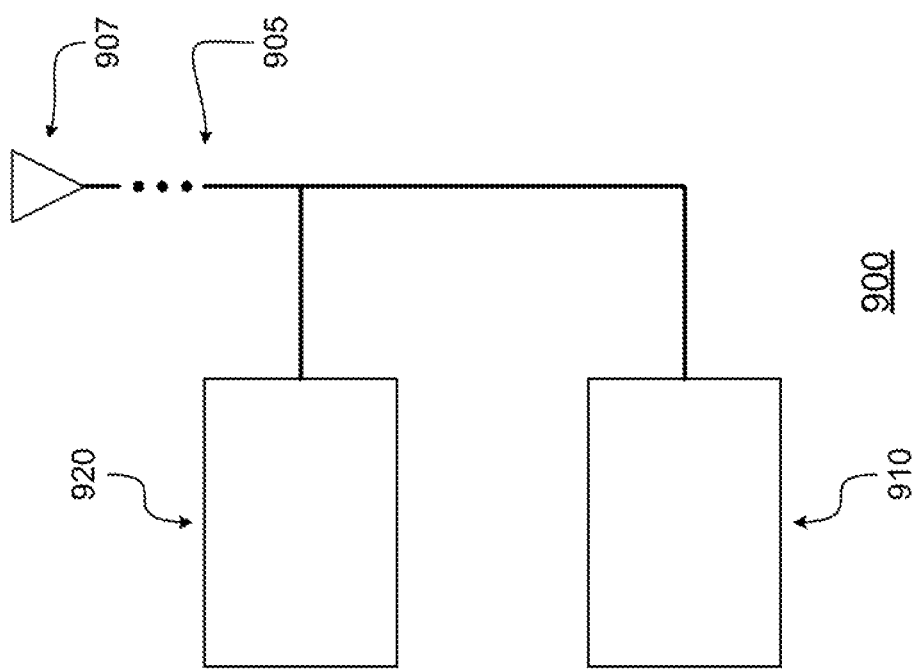
FIG. 9 illustrates hardware processing circuitries for an eNB to support low-latency PRACH procedures, in accordance with some embodiments of the disclosure.

FIG. 9 illustrates hardware processing circuitries for an eNB to support low-latency PRACH procedures, in accordance with some embodiments of the disclosure. With reference to FIG. 7, an eNB may include various hardware processing circuitries discussed herein (such as hardware processing circuitry 900 of FIG. 9), which may in turn comprise logic devices and/or circuitry operable to perform various operations. For example, in FIG. 7, eNB 710 (or various elements or components therein, such as hardware processing circuitry 720, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 716 (and/or one or more other processors which eNB 710 may comprise), memory 718, and/or other elements or components of eNB 710 (which may include hardware processing circuitry 720) may be arranged to perform the operations of these hardware processing circuitries, such as operations described herein with reference to devices and circuitry within these hardware processing circuitries. In some embodiments, processor 716 (and/or one or more other processors which eNB 710 may comprise) may be a baseband processor.

Returning to FIG. 9, an apparatus of eNB 710 (or another eNB or base station), which may be operable to communicate with one or more UEs on a wireless network, may comprise hardware processing circuitry 900. In some embodiments, hardware processing circuitry 900 may comprise one or more antenna ports 905 operable to provide various transmissions over a wireless communication channel (such as wireless communication channel 750). Antenna ports 905 may be coupled to one or more antennas 907 (which may be antennas 705). In some embodiments, hardware processing circuitry 900 may incorporate antennas 907, while in other embodiments, hardware processing circuitry 900 may merely be coupled to antennas 907.

Antenna ports 905 and antennas 907 may be operable to provide signals from an eNB to a wireless communications channel and/or a UE, and may be operable to provide signals from a UE and/or a wireless communications channel to an eNB. For example, antenna ports 905 and antennas 907 may be operable to provide transmissions from eNB 710 to wireless communication channel 750 (and from there to UE 730, or to another UE). Similarly, antennas 907 and antenna ports 905 may be operable to provide transmissions from a wireless communication channel 750 (and beyond that, from UE 730, or another UE) to eNB 710.

Hardware processing circuitry 900 may comprise various circuitries operable in accordance with the various embodiments discussed herein. With reference to FIG. 9, hardware processing circuitry 900 may comprise a first circuitry 910 and a second circuitry 920. First circuitry 910 may be operable to process a transmission from the UE on a bandwidth of the wireless network, the transmission comprising a PRACH preamble portion and a message portion, and the bandwidth being unlicensed spectrum. The message portion of the first transmission may comprise a MAC part carrying at least one of: a C-RNTI assigned to the UE, a BSR indicator, a Layer 1 or MAC UE capability indicator, a UE identity for contention resolution, or a RRC part including an RRC message with a UE identity for contention resolution.

In some embodiments, the transmission may be a first transmission, and second circuitry 920 may be operable to generate a second transmission comprising at least one of: a RAR, or a message portion.

For some embodiments, the second transmission may comprise one of: a PDCCH containing the C RNTI assigned to the UE or the UE identity, or an ePDCCH containing the C RNTI assigned to the UE or the UE identity. In some embodiments, the second transmission may comprise a MAC part carrying the C-RNTI assigned to the UE or the UE identity. For some embodiments, the second transmission may carry a UL grant allocation.

In some embodiments, the transmission may be a first transmission, and second circuitry 920 may be operable to generate a re-transmission of the first transmission if a UL grant allocation is not processed within a predetermined time window.

For some embodiments, the re-transmission of the first transmission may comprise a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution. In some embodiments, the predetermined time window may be one of: an absolute time, or a number of subframes bearing DL transmission. For some embodiments, the UL grant allocation may be masked with the C-RNTI assigned to the UE.

In some embodiments, the PRACH preamble may be generated to span one or more interlaces of a plurality of interlaces within a UL subframe, and remainder of the plurality of interlaces within the UL subframe may be generated to include data transmission. For some embodiments, the PRACH preamble may be generated to span a subset of OFDM symbols within a UL subframe, and a remainder of OFDM symbols within the UL subframe is generated to include data transmission.

For some embodiments, second circuitry 920 may be operable to generate a RAR message if the PRACH preamble is decoded successfully and the message portion is not decoded successfully.

In some embodiments, first circuitry 910 and/or second circuitry 920 may be implemented as separate circuitries. In other embodiments, first circuitry 910 and/or second circuitry 920 may be combined and implemented together in a circuitry without altering the essence of the embodiments.

Figure 10:
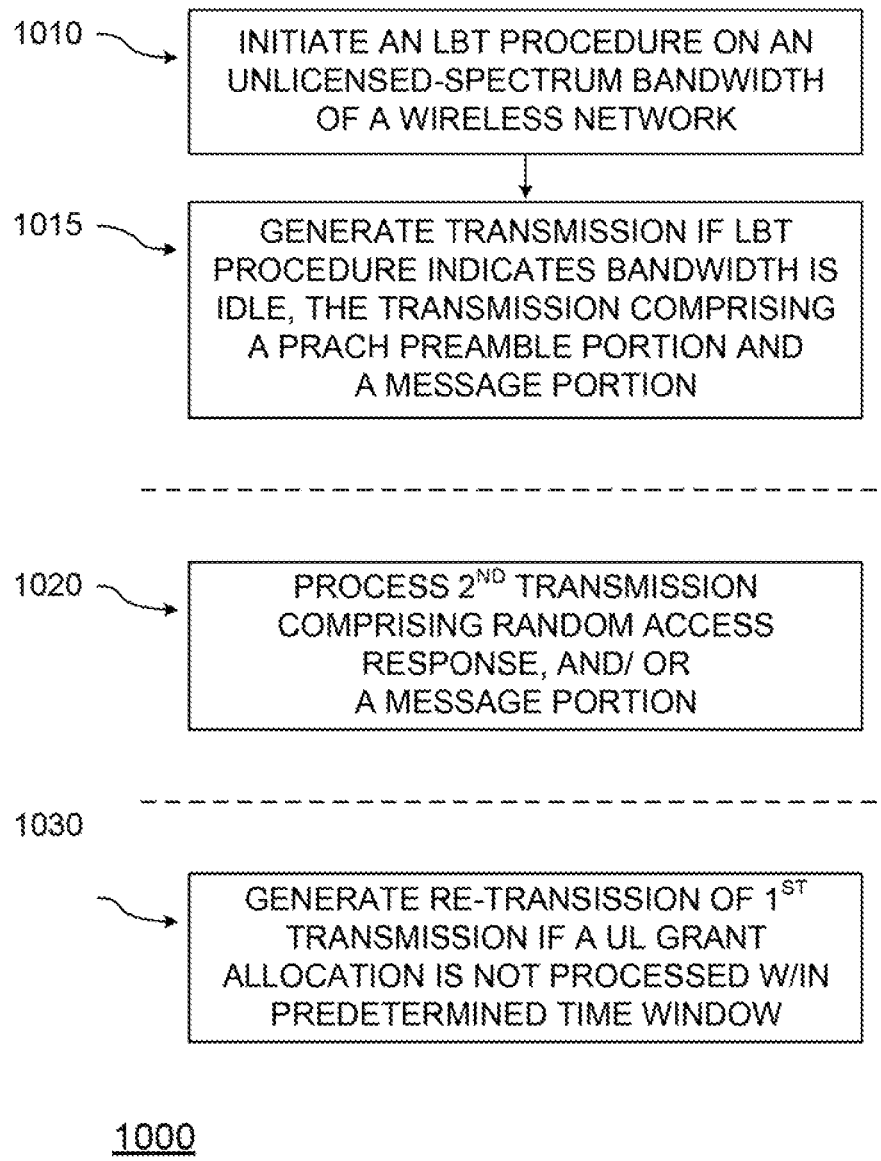
FIG. 10 illustrates methods for a UE to support low-latency PRACH procedures, in accordance with some embodiments of the disclosure.

FIG. 10 illustrates methods for a UE to support low-latency PRACH procedures, in accordance with some embodiments of the disclosure. With reference to FIG. 7, methods that may relate to UE 730 and hardware processing circuitry 740 are discussed herein. Although the actions in the method 1000 of FIG. 10 are shown in a particular order, the order of the actions can be modified. Thus, the illustrated embodiments can be performed in a different order, and some actions may be performed in parallel. Some of the actions and/or operations listed in FIG. 10 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 730 and/or hardware processing circuitry 740 to perform an operation comprising the methods of FIG. 10. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 10.

Returning to FIG. 10, various methods may be in accordance with the various embodiments discussed herein. A method 1000 may comprise an initiating 1010 and a generating 1015. In some embodiments, method 1000 may comprise a processing 1020 and/or a generating 1030. In initiating 1010, an LBT procedure may be initiated on a bandwidth of the wireless network, the bandwidth being unlicensed spectrum. In generating 1015, a transmission may be generated if the LBT procedure indicates that the bandwidth is idle, the transmission comprising a PRACH preamble portion and a message portion.

In some embodiments, the message portion of the first transmission may comprise a MAC part carrying at least one of: a C-RNTI assigned to the UE, a BSR indicator, a Layer 1 or MAC UE capability indicator, a UE identity for contention resolution, or a RRC part including an RRC message with a UE identity for contention resolution.

In some embodiments, the transmission may be a first transmission, and in processing 1020, a second transmission may be processed, the second transmission comprising at least one of: an RAR, or a message portion.

For some embodiments, the second transmission may comprise one of: a PDCCH containing the C-RNTI assigned to the UE or the UE identity, or an ePDCCH containing the C-RNTI assigned to the UE or the UE identity. In some embodiments, the second transmission may comprise a MAC part carrying the C-RNTI assigned to the UE or the UE identity. For some embodiments, the second transmission may comprise an RRC part including an RRC message carrying at least one of: the C-RNTI assigned to the UE, or the UE identity for contention resolution. In some embodiments, the second transmission may carry a UL grant allocation.

In some embodiments, the transmission may be a first transmission, and in generating 1030, a re-transmission of the first transmission may be generated if a UL grant allocation is not processed within a predetermined time window.

For some embodiments, the re-transmission of the first transmission may comprise a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution. In some embodiments, the predetermined time window may be one of: an absolute time, or a number of subframes bearing DL transmission. For some embodiments, the UL grant allocation may be masked with the C-RNTI assigned to the UE.

In some embodiments, the PRACH preamble portion may be generated to span one or more interlaces of a plurality of interlaces within a UL subframe, and a remainder of the plurality of interlaces within the UL subframe may be generated to include data transmission. For some embodiments, the PRACH preamble portion may be generated to span a subset of OFDM symbols within a UL subframe, and a remainder of OFDM symbols within the UL subframe may be generated to include data transmission.

For some embodiments, the PRACH preamble portion may incorporate a sPUCCH waveform. In some embodiments, the PRACH preamble portion may be mapped to ePUCCH resources.

Figure 11:
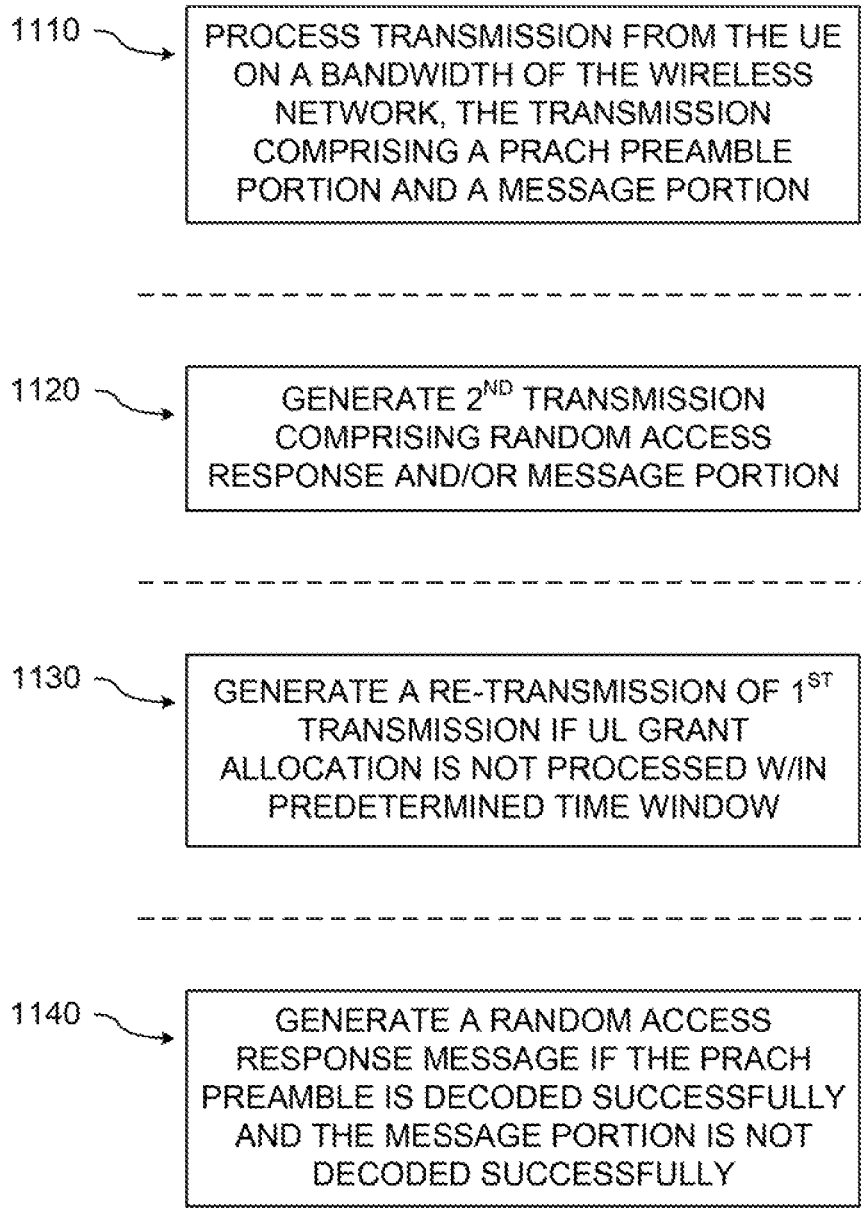
FIG. 11 illustrates methods for an eNB to support low-latency PRACH procedures, in accordance with some embodiments of the disclosure.

FIG. 11 illustrates methods for an eNB to support low-latency PRACH procedures, in accordance with some embodiments of the disclosure. With reference to FIG. 7, various methods that may relate to eNB 710 and hardware processing circuitry 720 are discussed herein. Although the actions in method 1100 of FIG. 11 are shown in a particular order, the order of the actions can be modified. Thus, the illustrated embodiments can be performed in a different order, and some actions may be performed in parallel. Some of the actions and/or operations listed in FIG. 11 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 710 and/or hardware processing circuitry 720 to perform an operation comprising the methods of FIG. 11. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 11.

Returning to FIG. 11, various methods may be in accordance with the various embodiments discussed herein. A method 1100 may comprise a processing 1110. In some embodiments, method 1100 may comprise a generating 1120, a generating 1130, and/or a generating 1140. In processing 1110, a transmission from the UE on a bandwidth of a wireless network may be processed, the transmission comprising a PRACH preamble portion and a message portion, and the bandwidth being unlicensed spectrum, wherein the message portion of the first transmission comprises a MAC part carrying at least one of: a C-RNTI assigned to the UE, a BSR indicator, a Layer 1 or MAC UE capability indicator, a UE identity for contention resolution, or an RRC part including an RRC message with a UE identity for contention resolution.

In some embodiments, the transmission may be a first transmission, and in generating 1120, a second transmission may be generated, the second transmission comprising at least one of: a RAR, or a message portion.

For some embodiments, the second transmission may comprise one of: a PDCCH containing the C RNTI assigned to the UE or the UE identity, or an ePDCCH containing the C RNTI assigned to the UE or the UE identity. In some embodiments, the second transmission may comprise a MAC part carrying the C-RNTI assigned to the UE or the UE identity. For some embodiments, the second transmission may carry a UL grant allocation.

In some embodiments, the transmission may be a first transmission, and in generating 1130, a re-transmission of the first transmission may be generated if a UL grant allocation is not processed within a predetermined time window.

For some embodiments, the re-transmission of the first transmission may comprise a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution. In some embodiments, the predetermined time window may be one of: an absolute time, or a number of subframes bearing DL transmission. For some embodiments, the UL grant allocation may be masked with the C-RNTI assigned to the UE.

In some embodiments, the PRACH preamble may be generated to span one or more interlaces of a plurality of interlaces within a UL subframe, and remainder of the plurality of interlaces within the UL subframe may be generated to include data transmission. For some embodiments, the PRACH preamble may be generated to span a subset of OFDM symbols within a UL subframe, and a remainder of OFDM symbols within the UL subframe is generated to include data transmission.

For some embodiments, in generating 1140, an RAR message may be generated if the PRACH preamble is decoded successfully and the message portion is not decoded successfully.

Figure 12:
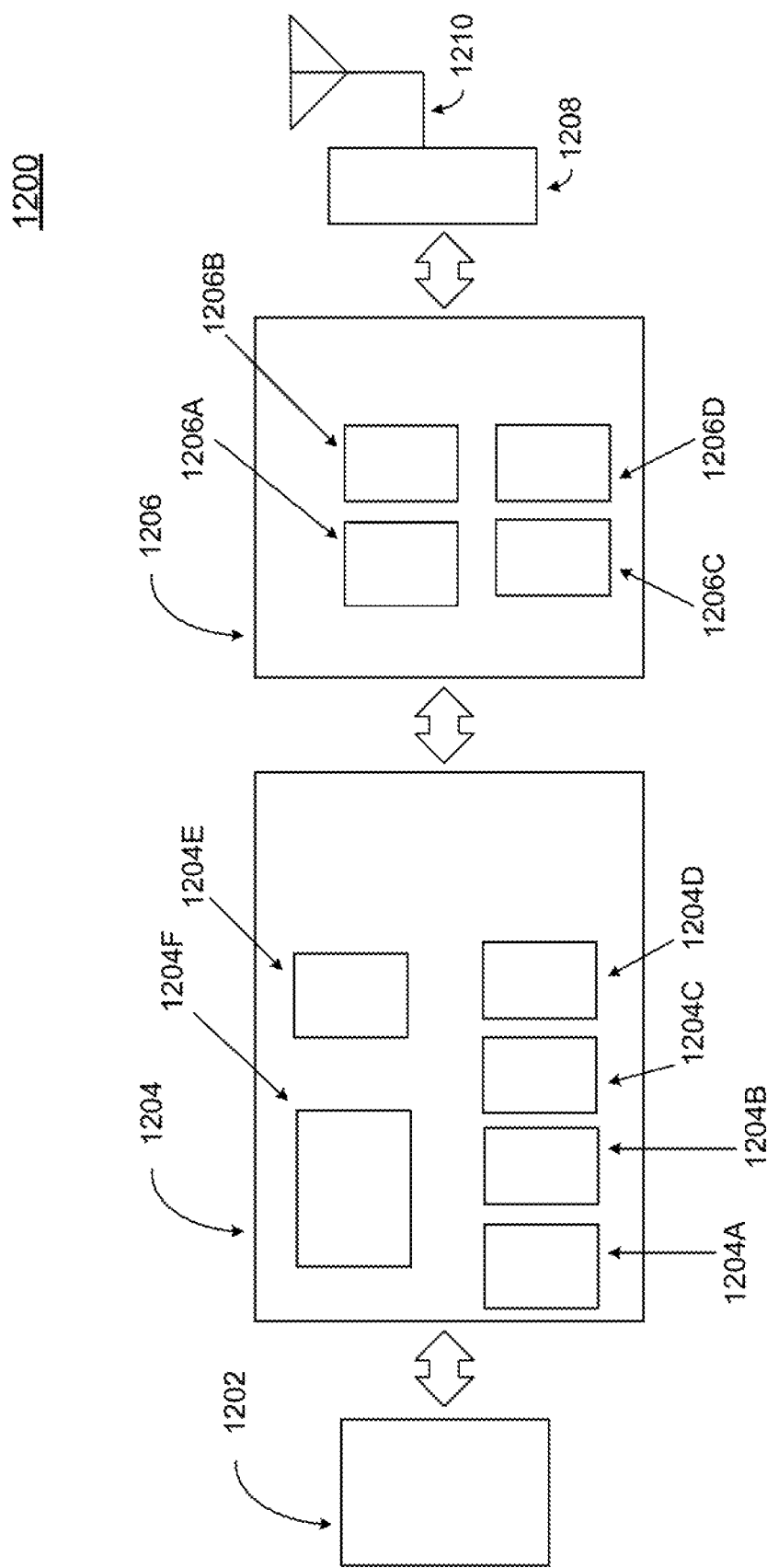
FIG. 12 illustrates example components of a UE device, in accordance with some embodiments of the disclosure.

FIG. 12 illustrates example components of a UE device 1200, in accordance with some embodiments of the disclosure. In some embodiments, a UE device 1200 may include application circuitry 1202, baseband circuitry 1204, Radio Frequency (RF) circuitry 1206, front-end module (FEM) circuitry 1208, a low-power wake-up receiver (LP-WUR), and one or more antennas 1210, coupled together at least as shown. In some embodiments, the UE device 1200 may include additional elements such as, for example, memory/storage, display, camera, sensor, and/or input/output (I/O) interface.

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204A, third generation (3G) baseband processor 1204B, fourth generation (4G) baseband processor 1204C, and/or other baseband processor(s) 1204D for other existing generations, generations in development or to be developed in the future (e.g., fifth generation (5G), 6G, etc.). The baseband circuitry 1204 (e.g., one or more of baseband processors 1204A-D) may handle various radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 1204E of the baseband circuitry 1204 may be configured to run elements of the protocol stack for signaling of the PHY, MAC, RLC, PDCP and/or RRC layers. In some embodiments, the baseband circuitry may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206A, amplifier circuitry 1206B and filter circuitry 1206C. The transmit signal path of the RF circuitry 1206 may include filter circuitry 1206C and mixer circuitry 1206A. RF circuitry 1206 may also include synthesizer circuitry 1206D for synthesizing a frequency for use by the mixer circuitry 1206A of the receive signal path and the transmit signal path. In some embodiments, the mixer circuitry 1206A of the receive signal path may be configured to down-convert RF signals received from the FEM circuitry 1208 based on the synthesized frequency provided by synthesizer circuitry 1206D. The amplifier circuitry 1206B may be configured to amplify the down-converted signals and the filter circuitry 1206C may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206A of the receive signal path may comprise passive mixers, although the scope of the embodiments is not limited in this respect.

In some embodiments, the mixer circuitry 1206A of the transmit signal path may be configured to up-convert input baseband signals based on the synthesized frequency provided by the synthesizer circuitry 1206D to generate RF output signals for the FEM circuitry 1208. The baseband signals may be provided by the baseband circuitry 1204 and may be filtered by filter circuitry 1206C. The filter circuitry 1206C may include a low-pass filter (LPF), although the scope of the embodiments is not limited in this respect.

In some embodiments, the mixer circuitry 1206A of the receive signal path and the mixer circuitry 1206A of the transmit signal path may include two or more mixers and may be arranged for quadrature down-conversion and/or up-conversion respectively. In some embodiments, the mixer circuitry 1206A of the receive signal path and the mixer circuitry 1206A of the transmit signal path may include two or more mixers and may be arranged for image rejection (e.g., Hartley image rejection). In some embodiments, the mixer circuitry 1206A of the receive signal path and the mixer circuitry 1206A of the transmit signal path may be arranged for direct down-conversion and/or direct up-conversion, respectively. In some embodiments, the mixer circuitry 1206A of the receive signal path and the mixer circuitry 1206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206D may be a fractional-N synthesizer or a fractional N/N+1 synthesizer, although the scope of the embodiments is not limited in this respect as other types of frequency synthesizers may be suitable. For example, synthesizer circuitry 1206D may be a delta-sigma synthesizer, a frequency multiplier, or a synthesizer comprising a phase-locked loop with a frequency divider.

The synthesizer circuitry 1206D may be configured to synthesize an output frequency for use by the mixer circuitry 1206A of the RF circuitry 1206 based on a frequency input and a divider control input. In some embodiments, the synthesizer circuitry 1206D may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206D of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210.

In some embodiments, the UE 1200 comprises a plurality of power saving mechanisms. If the UE 1200 is in an RRC_Connected state, where it is still connected to the eNB as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 1200 may transition off to an RRC_Idle state, where it disconnects from the network and does not perform operations such as channel quality feedback, handover, etc. The UE 1200 goes into a very low power state and it performs paging where again it periodically wakes up to listen to the network and then powers down again. Since the device might not receive data in this state, in order to receive data, it should transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

In addition, in various embodiments, an eNB device may include components substantially similar to one or more of the example components of UE device 1200 described herein.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with an Evolved Node B (eNB) on a wireless network, comprising: one or more processors to: initiate a Listen-Before-Talk (LBT) procedure on a bandwidth of the wireless network, the bandwidth being unlicensed spectrum; and generate a transmission if the LBT procedure indicates that the bandwidth is idle, the transmission comprising a Physical Random Access Channel (PRACH) preamble portion and a message portion, and an interface to output the transmission.

In example 2, the apparatus of example 1, wherein the message portion of the first transmission comprises a Medium Access Control (MAC) part carrying at least one of: a Cell Radio Network Temporary Identifier (C-RNTI) assigned to the UE, a Buffer Status Report (BSR) indicator, a Layer 1 or MAC UE capability indicator, a UE identity for contention resolution, or a Radio Resource Control (RRC) part including an RRC message with a UE identity for contention resolution.

In example 3, the apparatus of example 2, wherein the transmission is a first transmission, and wherein the one or more processors are to: process a second transmission comprising at least one of: a Random Access Response (RAR), or a message portion.

In example 4, the apparatus of example 3, wherein the second transmission comprises one of: a Physical Downlink Control Channel (PDCCH) containing the C-RNTI assigned to the UE or the UE identity, or an enhanced PDCCH (ePDCCH) containing the C-RNTI assigned to the UE or the UE identity.

In example 5, the apparatus of example 3, wherein the second transmission comprises a MAC part carrying the C-RNTI assigned to the UE or the UE identity.

In example 6, the apparatus of example 3, wherein the second transmission comprises an RRC part including an RRC message carrying at least one of: the C-RNTI assigned to the UE, or the UE identity for contention resolution.

In example 7, the apparatus of example 2, wherein the second transmission carries a UL grant allocation.

In example 8, the apparatus of example 2, wherein the transmission is a first transmission, and wherein the one or more processors are to: generate a re-transmission of the first transmission if a UL grant allocation is not processed within a predetermined time window.

In example 9, the apparatus of example 8, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 10, the apparatus of example 8, wherein the predetermined time window is be one of: an absolute time, or a number of subframes bearing DL transmission.

In example 11, the apparatus of example 8, wherein the UL grant allocation is masked with the C-RNTI assigned to the UE.

In example 12, the apparatus of any of examples 1 through 11, wherein the PRACH preamble portion is generated to span one or more interlaces of a plurality of interlaces within a UL subframe; and wherein a remainder of the plurality of interlaces within the UL subframe is generated to include data transmission.

In example 13, the apparatus of any of examples 1 through 12, wherein the PRACH preamble portion is generated to span a subset of Orthogonal Frequency-Division Multiplexing (OFDM) symbols within a UL subframe; and wherein a remainder of OFDM symbols within the UL subframe is generated to include data transmission.

In example 14, the apparatus of any of examples 1 through 13, wherein the PRACH preamble portion incorporates a short Physical Uplink Control Channel (sPUCCH) waveform.

In example 15, the apparatus of any of examples 1 through 14, wherein the PRACH preamble portion is mapped to enhanced Physical Uplink Control Channel (ePUCCH) resources.

In example 16, the apparatus of any of examples 1 through 15, comprising a transceiver circuitry for at least one of: generating transmissions, encoding transmissions, processing transmissions, or decoding transmissions.

Example 17 provides a User Equipment (UE) device comprising an application processor, a memory, one or more antennas, a wireless interface for allowing the application processor to communicate with another device, and a touchscreen display, the UE device including the apparatus of any of examples 1 through 15.

Example 18 provides a method comprising: initiating, for a User Equipment (UE), a Listen-Before-Talk (LBT) procedure on a bandwidth of the wireless network, the bandwidth being unlicensed spectrum; and generating a transmission if the LBT procedure indicates that the bandwidth is idle, the transmission comprising a Physical Random Access Channel (PRACH) preamble portion and a message portion.

In example 19, the method of example 18, wherein the message portion of the first transmission comprises a Medium Access Control (MAC) part carrying at least one of: a Cell Radio Network Temporary Identifier (C-RNTI) assigned to the UE, a Buffer Status Report (BSR) indicator, a Layer 1 or MAC UE capability indicator, a UE identity for contention resolution, or a Radio Resource Control (RRC) part including an RRC message with a UE identity for contention resolution.

In example 20, the method of example 19, wherein the transmission is a first transmission, comprising: processing a second transmission comprising at least one of: a Random Access Response (RAR), or a message portion.

In example 21, the method of example 20, wherein the second transmission comprises one of: a Physical Downlink Control Channel (PDCCH) containing the C RNTI assigned to the UE or the UE identity, or an enhanced PDCCH (ePDCCH) containing the C RNTI assigned to the UE or the UE identity.

In example 22, the method of example 20, wherein the second transmission comprises a MAC part carrying the C-RNTI assigned to the UE or the UE identity.

In example 23, the method of example 20, wherein the second transmission comprises an RRC part including an RRC message carrying at least one of: the C-RNTI assigned to the UE, or the UE identity for contention resolution.

In example 24, the method of example 19, wherein the second transmission carries a UL grant allocation.

In example 25, the method of example 19, wherein the transmission is a first transmission, comprising: generating a re-transmission of the first transmission if a UL grant allocation is not processed within a predetermined time window.

In example 26, the method of example 25, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 27, the method of example 25, wherein the predetermined time window is be one of: an absolute time, or a number of subframes bearing DL transmission.

In example 28, the method of example 25, wherein the UL grant allocation is masked with the C-RNTI assigned to the UE.

In example 29, the method of any of examples 18 through 28, wherein the PRACH preamble portion is generated to span one or more interlaces of a plurality of interlaces within a UL subframe; and wherein a remainder of the plurality of interlaces within the UL subframe is generated to include data transmission.

In example 30, the method of any of examples 18 through 29, wherein the PRACH preamble portion is generated to span a subset of Orthogonal Frequency-Division Multiplexing (OFDM) symbols within a UL subframe; and wherein a remainder of OFDM symbols within the UL subframe is generated to include data transmission.

In example 31, the method of any of examples 18 through 30, wherein the PRACH preamble portion incorporates a short Physical Uplink Control Channel (sPUCCH) waveform.

In example 32, the method of any of examples 18 through 31, wherein the PRACH preamble portion is mapped to enhanced Physical Uplink Control Channel (ePUCCH) resources.

Example 33 provides machine readable storage media having machine executable instructions stored thereon that, when executed, cause one or more processors to perform a method according to any of examples 18 through 32.

Example 34 provides an apparatus of a User Equipment (UE) operable to communicate with an Evolved Node B (eNB) on a wireless network, comprising: means for initiating a Listen-Before-Talk (LBT) procedure on a bandwidth of the wireless network, the bandwidth being unlicensed spectrum; and means for generating a transmission if the LBT procedure indicates that the bandwidth is idle, the transmission comprising a Physical Random Access Channel (PRACH) preamble portion and a message portion.

In example 35, the method of example 34, wherein the message portion of the first transmission comprises a Medium Access Control (MAC) part carrying at least one of: a Cell Radio Network Temporary Identifier (C-RNTI) assigned to the UE, a Buffer Status Report (BSR) indicator, a Layer 1 or MAC UE capability indicator, a UE identity for contention resolution, or a Radio Resource Control (RRC) part including an RRC message with a UE identity for contention resolution.

In example 36, the method of example 35, wherein the transmission is a first transmission, comprising: means for processing a second transmission comprising at least one of: a Random Access Response (RAR), or a message portion.

In example 37, the method of example 36, wherein the second transmission comprises one of: a Physical Downlink Control Channel (PDCCH) containing the C RNTI assigned to the UE or the UE identity, or an enhanced PDCCH (ePDCCH) containing the C RNTI assigned to the UE or the UE identity.

In example 38, the method of example 36, wherein the second transmission comprises a MAC part carrying the C-RNTI assigned to the UE or the UE identity.

In example 39, the method of example 36, wherein the second transmission comprises an RRC part including an RRC message carrying at least one of: the C-RNTI assigned to the UE, or the UE identity for contention resolution.

In example 40, the method of example 35, wherein the second transmission carries a UL grant allocation.

In example 41, the method of example 35, wherein the transmission is a first transmission, comprising: means for generating a re-transmission of the first transmission if a UL grant allocation is not processed within a predetermined time window.

In example 42, the method of example 41, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 43, the method of example 41, wherein the predetermined time window is be one of: an absolute time, or a number of subframes bearing DL transmission.

In example 44, the method of example 41, wherein the UL grant allocation is masked with the C-RNTI assigned to the UE.

In example 45, the method of any of examples 34 through 44, wherein the PRACH preamble portion is generated to span one or more interlaces of a plurality of interlaces within a UL subframe; and wherein a remainder of the plurality of interlaces within the UL subframe is generated to include data transmission.

In example 46, the method of any of examples 34 through 45, wherein the PRACH preamble portion is generated to span a subset of Orthogonal Frequency-Division Multiplexing (OFDM) symbols within a UL subframe; and wherein a remainder of OFDM symbols within the UL subframe is generated to include data transmission.

In example 47, the method of any of examples 34 through 46, wherein the PRACH preamble portion incorporates a short Physical Uplink Control Channel (sPUCCH) waveform.

In example 48, the method of any of examples 34 through 47, wherein the PRACH preamble portion is mapped to enhanced Physical Uplink Control Channel (ePUCCH) resources.

Example 49 provides machine readable storage media having machine executable instructions that, when executed, cause one or more processors of a User Equipment (UE) operable to communicate with an Evolved Node-B (eNB) on a wireless network to perform an operation comprising: initiate a Listen-Before-Talk (LBT) procedure on a bandwidth of the wireless network, the bandwidth being unlicensed spectrum; and generate a transmission if the LBT procedure indicates that the bandwidth is idle, the transmission comprising a Physical Random Access Channel (PRACH) preamble portion and a message portion.

In example 50, the machine readable storage media of example 49, wherein the message portion of the first transmission comprises a Medium Access Control (MAC) part carrying at least one of: a Cell Radio Network Temporary Identifier (C-RNTI) assigned to the UE, a Buffer Status Report (BSR) indicator, a Layer 1 or MAC UE capability indicator, a UE identity for contention resolution, or a Radio Resource Control (RRC) part including an RRC message with a UE identity for contention resolution.

In example 51, the machine readable storage media of example 50, wherein the transmission is a first transmission, and the operation comprising: process a second transmission comprising at least one of: a Random Access Response (RAR), or a message portion.

In example 52, the machine readable storage media of example 51, wherein the second transmission comprises one of: a Physical Downlink Control Channel (PDCCH) containing the C RNTI assigned to the UE or the UE identity, or an enhanced PDCCH (ePDCCH) containing the C RNTI assigned to the UE or the UE identity.

In example 53, the machine readable storage media of example 51, wherein the second transmission comprises a MAC part carrying the C-RNTI assigned to the UE or the UE identity.

In example 54, the machine readable storage media of example 51, wherein the second transmission comprises an RRC part including an RRC message carrying at least one of: the C-RNTI assigned to the UE, or the UE identity for contention resolution.

In example 55, the machine readable storage media of example 50, wherein the second transmission carries a UL grant allocation.

In example 56, the machine readable storage media of example 50, wherein the transmission is a first transmission, and the operation comprising: generate a re-transmission of the first transmission if a UL grant allocation is not processed within a predetermined time window.

In example 57, the machine readable storage media of example 56, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 58, the machine readable storage media of example 56, wherein the predetermined time window is be one of: an absolute time, or a number of subframes bearing DL transmission.

In example 59, the machine readable storage media of example 56, wherein the UL grant allocation is masked with the C-RNTI assigned to the UE.

In example 60, the machine readable storage media of any of examples 49 through 59, wherein the PRACH preamble portion is generated to span one or more interlaces of a plurality of interlaces within a UL subframe; and wherein a remainder of the plurality of interlaces within the UL subframe is generated to include data transmission.

In example 61, the machine readable storage media of any of examples 49 through 60, wherein the PRACH preamble portion is generated to span a subset of Orthogonal Frequency-Division Multiplexing (OFDM) symbols within a UL subframe; and wherein a remainder of OFDM symbols within the UL subframe is generated to include data transmission.

In example 62, the machine readable storage media of any of examples 49 through 61, wherein the PRACH preamble portion incorporates a short Physical Uplink Control Channel (sPUCCH) waveform.

In example 63, the machine readable storage media of any of examples 49 through 62, wherein the PRACH preamble portion is mapped to enhanced Physical Uplink Control Channel (ePUCCH) resources.

Example 64 provides an apparatus of an Evolved Node B (eNB) operable to communicate with a User Equipment (UE) on a wireless network, comprising: one or more processors to: process a transmission from the UE on a bandwidth of the wireless network, the transmission comprising a Physical Random Access Channel (PRACH) preamble portion and a message portion, and the bandwidth being unlicensed spectrum, wherein the message portion of the first transmission comprises a Medium Access Control (MAC) part carrying at least one of: a Cell Radio Network Temporary Identifier (C-RNTI) assigned to the UE, a Buffer Status Report (BSR) indicator, a Layer 1 or MAC UE capability indicator, a UE identity for contention resolution, or a Radio Resource Control (RRC) part including an RRC message with a UE identity for contention resolution, and an interface to input the transmission.

In example 65, the apparatus of example 64, wherein the transmission is a first transmission, and wherein the one or more processors are to: generate a second transmission comprising at least one of: a Random Access Response (RAR), or a message portion.

In example 66, the apparatus of example 65, wherein the second transmission comprises one of: a Physical Downlink Control Channel (PDCCH) containing the C RNTI assigned to the UE or the UE identity, or an enhanced PDCCH (ePDCCH) containing the C RNTI assigned to the UE or the UE identity.

In example 67, the apparatus of example 65, wherein the second transmission comprises a MAC part carrying the C-RNTI assigned to the UE or the UE identity.

In example 68, the apparatus of example 64, wherein the second transmission carries a UL grant allocation.

In example 69, the apparatus of example 64, wherein the transmission is a first transmission, and wherein the one or more processors are to: generate a re-transmission of the first transmission if a UL grant allocation is not processed within a predetermined time window.

In example 70, the apparatus of example 69, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 71, the apparatus of example 69, wherein the predetermined time window is be one of: an absolute time, or a number of subframes bearing DL transmission.

In example 72, the apparatus of example 69, wherein the UL grant allocation is masked with the C-RNTI assigned to the UE.

In example 73, the apparatus of any of examples 64 through 72, wherein the PRACH preamble is generated to span one or more interlaces of a plurality of interlaces within a UL subframe; and wherein a remainder of the plurality of interlaces within the UL subframe is generated to include data transmission.

In example 74, the apparatus of any of examples 64 through 73, wherein the PRACH preamble is generated to span a subset of Orthogonal Frequency-Division Multiplexing (OFDM) symbols within a UL subframe; and wherein a remainder of OFDM symbols within the UL subframe is generated to include data transmission.

In example 75, the apparatus of any of examples 64 through 74, wherein the one or more processors are to: generate a Random Access Response (RAR) message if the PRACH preamble is decoded successfully and the message portion is not decoded successfully.

In example 76, the apparatus of any of examples 64 through 74, comprising a transceiver circuitry for at least one of: generating transmissions, encoding transmissions, processing transmissions, or decoding transmissions.

Example 77 provides an Evolved Node B (eNB) device comprising an application processor, a memory, one or more antenna ports, and an interface for allowing the application processor to communicate with another device, the eNB device including the apparatus of any of examples 64 through 74.

Example 78 provides a method comprising: processing, for an Evolved Node-B (eNB), a transmission from the UE on a bandwidth of the wireless network, the transmission comprising a Physical Random Access Channel (PRACH) preamble portion and a message portion, and the bandwidth being unlicensed spectrum, wherein the message portion of the first transmission comprises a Medium Access Control (MAC) part carrying at least one of: a Cell Radio Network Temporary Identifier (C-RNTI) assigned to the UE, a Buffer Status Report (BSR) indicator, a Layer 1 or MAC UE capability indicator, a UE identity for contention resolution, or a Radio Resource Control (RRC) part including an RRC message with a UE identity for contention resolution.

In example 79, the method of example 78, wherein the transmission is a first transmission, comprising: generating a second transmission comprising at least one of: a Random Access Response (RAR), or a message portion.

In example 80, the method of example 79, wherein the second transmission comprises one of: a Physical Downlink Control Channel (PDCCH) containing the C RNTI assigned to the UE or the UE identity, or an enhanced PDCCH (ePDCCH) containing the C RNTI assigned to the UE or the UE identity.

In example 81, the method of example 79, wherein the second transmission comprises a MAC part carrying the C-RNTI assigned to the UE or UE identity.

In example 82, the method of example 78, wherein the second transmission carries a UL grant allocation.

In example 83, the method of example 78, wherein the transmission is a first transmission, comprising: generating a re-transmission of the first transmission if a UL grant allocation is not processed within a predetermined time window.

In example 84, the method of example 83, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 85, the method of example 83, wherein the predetermined time window is be one of: an absolute time, or a number of subframes bearing DL transmission.

In example 86, the method of example 83, wherein the UL grant allocation is masked with the C-RNTI assigned to the UE.

In example 87, the method of any of examples 78 through 86, wherein the PRACH preamble is generated to span one or more interlaces of a plurality of interlaces within a UL subframe; and wherein a remainder of the plurality of interlaces within the UL subframe is generated to include data transmission.

In example 88, the method of any of examples 78 through 87, wherein the PRACH preamble is generated to span a subset of Orthogonal Frequency-Division Multiplexing (OFDM) symbols within a UL subframe; and wherein a remainder of OFDM symbols within the UL subframe is generated to include data transmission.

In example 89, the method of any of examples 78 through 88, comprising: generating a Random Access Response (RAR) message if the PRACH preamble is decoded successfully and the message portion is not decoded successfully.

Example 90 provides machine readable storage media having machine executable instructions stored thereon that, when executed, cause one or more processors to perform a method according to any of examples 78 through 89.

Example 91 provides an apparatus of an Evolved Node B (eNB) operable to communicate with a User Equipment (UE) on a wireless network, comprising: means for processing a transmission from the UE on a bandwidth of the wireless network, the transmission comprising a Physical Random Access Channel (PRACH) preamble portion and a message portion, and the bandwidth being unlicensed spectrum, wherein the message portion of the first transmission comprises a Medium Access Control (MAC) part carrying at least one of: a Cell Radio Network Temporary Identifier (C-RNTI) assigned to the UE, a Buffer Status Report (BSR)

indicator, a Layer 1 or MAC UE capability indicator, a UE identity for contention resolution, or a Radio Resource Control (RRC) part including an RRC message with a UE identity for contention resolution.

In example 92, the apparatus of example 91, wherein the transmission is a first transmission, comprising: means for generating a second transmission comprising at least one of: a Random Access Response (RAR), or a message portion.

In example 93, the apparatus of example 92, wherein the second transmission comprises one of: a Physical Downlink Control Channel (PDCCH) containing the C RNTI assigned to the UE or the UE identity, or an enhanced PDCCH (ePDCCH) containing the C RNTI assigned to the UE or the UE identity.

In example 94, the apparatus of example 92, wherein the second transmission comprises a MAC part carrying the C-RNTI assigned to the UE or UE identity.

In example 95, the apparatus of example 91, wherein the second transmission carries a UL grant allocation.

In example 96, the apparatus of example 91, wherein the transmission is a first transmission, comprising: means for generating a re-transmission of the first transmission if a UL grant allocation is not processed within a predetermined time window.

In example 97, the apparatus of example 96, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 98, the apparatus of example 96, wherein the predetermined time window is be one of: an absolute time, or a number of subframes bearing DL transmission.

In example 99, the apparatus of example 96, wherein the UL grant allocation is masked with the C-RNTI assigned to the UE.

In example 100, the apparatus of any of examples 91 through 99, wherein the PRACH preamble is generated to span one or more interlaces of a plurality of interlaces within a UL subframe; and wherein a remainder of the plurality of interlaces within the UL subframe is generated to include data transmission.

In example 101, the apparatus of any of examples 91 through 100, wherein the PRACH preamble is generated to span a subset of Orthogonal Frequency-Division Multiplexing (OFDM) symbols within a UL subframe; and wherein a remainder of OFDM symbols within the UL subframe is generated to include data transmission.

In example 102, the apparatus of any of examples 91 through 101, comprising: means for generating a Random Access Response (RAR) message if the PRACH preamble is decoded successfully and the message portion is not decoded successfully.

Example 103 provides machine readable storage media having machine executable instructions that, when executed, cause one or more processors of an Evolved Node B (eNB) operable to communicate with a User Equipment (UE) on a wireless network to perform an operation comprising: process a transmission from the UE on a bandwidth of the wireless network, the transmission comprising a Physical Random Access Channel (PRACH) preamble portion and a message portion, and the bandwidth being unlicensed spectrum, wherein the message portion of the first transmission comprises a Medium Access Control (MAC) part carrying at least one of: a Cell Radio Network Temporary Identifier (C-RNTI) assigned to the UE, a Buffer Status Report (BSR) indicator, a Layer 1 or MAC UE capability indicator, a UE identity for contention resolution, or a Radio Resource Control (RRC) part including an RRC message with a UE identity for contention resolution.

In example 104, the machine readable storage media of example 103, wherein the transmission is a first transmission, and the operation comprising: generate a second transmission comprising at least one of: a Random Access Response (RAR), or a message portion.

In example 105, the machine readable storage media of example 104, wherein the second transmission comprises one of: a Physical Downlink Control Channel (PDCCH) containing the C RNTI assigned to the UE or the UE identity, or an enhanced PDCCH (ePDCCH) containing the C RNTI assigned to the UE or the UE identity.

In example 106, the machine readable storage media of example 104, wherein the second transmission comprises a MAC part carrying the C-RNTI assigned to the UE or UE identity.

In example 107, the machine readable storage media of example 103, wherein the second transmission carries a UL grant allocation.

In example 108, the machine readable storage media of example 103, wherein the transmission is a first transmission, and the operation comprising: generate a re-transmission of the first transmission if a UL grant allocation is not processed within a predetermined time window.

In example 109, the machine readable storage media of example 108, wherein the re-transmission of the first transmission comprises a MAC part carrying at least one of: the C-RNTI assigned to the UE, the BSR indicator, a Layer 1 or MAC UE capability indicator, a UE identity for contention resolution, or the RRC part including the RRC message with the UE identity for contention resolution.

In example 110, the machine readable storage media of example 108, wherein the predetermined time window is be one of: an absolute time, or a number of subframes bearing DL transmission.

In example 111, the machine readable storage media of example 108, wherein the UL grant allocation is masked with the C-RNTI assigned to the UE.

In example 112, the machine readable storage media of any of examples 103 through 111, wherein the PRACH preamble is generated to span one or more interlaces of a plurality of interlaces within a UL subframe; and wherein a remainder of the plurality of interlaces within the UL subframe is generated to include data transmission.

In example 113, the machine readable storage media of any of examples 103 through 112, wherein the PRACH preamble is generated to span a subset of Orthogonal Frequency-Division Multiplexing (OFDM) symbols within a UL subframe; and wherein a remainder of OFDM symbols within the UL subframe is generated to include data transmission.

In example 114, the machine readable storage media of any of examples 103 through 113, the operation comprising: generate a Random Access Response (RAR) message if the PRACH preamble is decoded successfully and the message portion is not decoded successfully.

In example 115, the apparatus of any of examples 1 through 13 and any of examples 64 through 74, wherein the one or more processors comprise a baseband processor.

In example 116, the apparatus of any of examples 1 through 13 and any of examples 64 through 74, comprising a memory for storing instructions, the memory being coupled to the one or more processors.

In example 117, the apparatus of any of examples 1 through 13 and any of examples 64 through 74, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station on a wireless network, comprising:
one or more processors to:
initiate a Listen-Before-Talk (LBT) procedure on a bandwidth of the wireless network, the bandwidth being unlicensed spectrum; and
generate a transmission if the LBT procedure indicates that the bandwidth is idle, the transmission comprising a Physical Random Access Channel (PRACH) preamble portion together with a message portion within the transmission, wherein the PRACH preamble portion is transmitted in a first part of an uplink (UL) subframe of the transmission, and the message portion is transmitted in second part of the UL subframe of the transmission;
process a Physical Downlink Control Channel (PDCCH) received from the base station containing a Cell Radio Network Temporary Identifier (C-RNTI) assigned to the UE; and
an interface to output the transmission.

2. The UE of claim 1,
wherein the message portion of the transmission comprises a Medium Access Control (MAC) part carrying at least one of: the C-RNTI assigned to the UE, a Buffer Status Report (BSR) indicator, a Layer I or MAC UE capability indicator, a UE identity for contention resolution, or a Radio Resource Control (RRC) part including an RRC message with the UE identity for contention resolution.

3. The UE of claim 2, wherein the transmission is a first transmission, and wherein the one or more processors are to:
process a second transmission comprising at least one of: a Random Access Response (RAR), or a message portion.

4. The UE of claim 3,
wherein the second transmission comprises one of: the PDCCH containing the C-RNTI assigned to the UE or the UE identity, or an enhanced PDCCH (ePDCCH) containing the C-RNTI assigned to the UE or the UE identity.

5. The UE of claim 3,
wherein the second transmission comprises a MAC part carrying the C-RNTI assigned to the UE or the UE identity.

6. The UE of claim 3,
wherein the second transmission comprises an RRC part including an RRC message carrying at least one of: the C-RNTI assigned to the UE, or the UE identity for contention resolution.

7. Machine readable storage media having machine executable instructions that, when executed, cause one or more processors of a User Equipment (UE) operable to communicate with a base station on a wireless network to perform operations comprising:
initiating a Listen-Before-Talk (LBT) procedure on a bandwidth of the wireless network, the bandwidth being unlicensed spectrum;
generating a transmission if the LBT procedure indicates that the bandwidth is idle, the transmission comprising a Physical Random Access Channel (PRACH) preamble portion together with a message portion within the transmission, wherein the PRACH preamble portion is transmitted in a first part of an uplink (UL) subframe of the transmission, and the message portion is transmitted in a second part of the UL subframe of the transmission; and
processing a Physical Downlink Control Channel (PDCCH) received from the base station containing a Cell Radio Network Temporary Identifier (C-RNTI) assigned to the UE.

8. The machine readable storage media of claim 7,
wherein the message portion of the transmission comprises a Medium Access Control (MAC) part carrying at least one of: the C-RNTI assigned to the UE, a Buffer Status Report (BSR) indicator, a Layer 1 or MAC UE capability indicator, a UE identity for contention resolution, or a Radio Resource Control (RRC) part including an RRC message with the UE identity for contention resolution.

9. The machine readable storage media of claim 8, wherein the transmission is a first transmission, and the operations further comprising:
processing a second transmission comprising at least one of: a Random Access Response (RAR), or a message portion.

10. The machine readable storage media of claim 9,
wherein the second transmission comprises one of: the PDCCH containing the C-RNTI assigned to the UE or the UE identity, or an enhanced PDCCH (ePDCCH) containing the C-RNTI assigned to the UE or the UE identity.

11. The machine readable storage media of claim 9,
wherein the second transmission comprises a MAC part carrying the C-RNTI assigned to the UE or the UE identity.

12. The machine readable storage media of claim 9,
wherein the second transmission comprises an RRC part including an RRC message carrying at least one of: the C-RNTI assigned to the UE, or the UE identity for contention resolution.

13. The UE of claim 1, wherein the PRACH preamble portion is transmitted in one or more interlaces over the UL subframe, and the message portion is transmitted in one or more of remaining interlaces over the UL subframe.

14. The UE of claim 1, wherein the UL subframe further includes a guard band between the PRACH preamble portion and the message portion in a frequency domain.

15. The UE of claim 1, wherein the PRACH preamble portion is transmitted in a subset of OFDM symbols within the UL subframe, and the message portion is carried in remaining symbols within the UL subframe.

16. The UE of claim 15, wherein the PRACH preamble portion is transmitted in consecutive OFDM symbols.

17. The machine readable storage media of claim 7, wherein the PRACH preamble portion is transmitted in one or more interlaces over the UL subframe, and the message portion is transmitted in one or more of remaining interlaces over the UL subframe.

18. The machine readable storage media of claim 7, wherein the UL subframe further includes a guard band between the PRACH preamble portion and the message portion in frequency domain.

19. The machine readable storage media of claim 7, wherein the PRACH preamble portion is transmitted in a subset of OFDM symbols within the UL subframe, and the message portion is carried in remaining symbols within the UL subframe.

20. The machine readable storage media of claim 19, wherein the PRACH preamble portion is transmitted in consecutive OFDM symbols.

\* \* \* \* \*